(12) United States Patent
Sugita et al.

(10) Patent No.: US 7,582,991 B2
(45) Date of Patent: Sep. 1, 2009

(54) LINEAR MOTOR

(75) Inventors: Satoshi Sugita, Nagano (JP); Yasushi Misawa, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 346 days.

(21) Appl. No.: 11/682,368

(22) Filed: Mar. 6, 2007

(65) Prior Publication Data
US 2007/0205673 A1  Sep. 6, 2007

(30) Foreign Application Priority Data
Mar. 6, 2006  (JP) .............................. 2006-059711

(51) Int. Cl.
*H02K 41/03*  (2006.01)
(52) U.S. Cl. ...................................... 310/12
(58) Field of Classification Search ............. 310/12–13, 310/15–16; *H02K 41/02, 41/03*
See application file for complete search history.

(56) References Cited

U.S. PATENT DOCUMENTS

| 4,912,746 A | * | 3/1990 | Oishi | 310/12 |
| 5,910,691 A | * | 6/1999 | Wavre | 310/12 |
| 7,205,687 B2 | * | 4/2007 | Wavre et al. | 310/58 |
| 7,230,355 B2 | * | 6/2007 | Lin et al. | 310/12 |

FOREIGN PATENT DOCUMENTS

| JP | 11-206100 | 7/1999 |
| JP | 2001-008432 | 12/2001 |
| JP | 2002-176762 | 6/2002 |
| JP | 2003-158864 | 5/2003 |

* cited by examiner

*Primary Examiner*—Tran N Nguyen
(74) *Attorney, Agent, or Firm*—Rankin, Hill & Clark LLP

(57) ABSTRACT

A linear motor for which armature core can readily be manufactured is provided.

An armature 10 is constituted from an armature core main portion 19 and first magnetic pole constituent components 21A to 21C. The armature main core portion 19 comprises second magnetic pole portions 25A to 25D which are not wound with a winding conductor and magnetic pole connecting sections 27, and is constituted by stacking a plurality of magnetic steel sheets in an orthogonal direction D3. The first magnetic pole constituent portions 21A to 21C respectively include magnetic pole main portions 29 and winding portions 31. The magnetic pole main portion 29 includes a wound portion and a pair of non-wound portions integrally provided at each end of the wound portion. End portions of the wound portions of the first magnetic pole portion (20A to 20C) in the orthogonal direction D3 are located more inwardly than end surfaces of the second magnetic pole portions 25A to 25D in the orthogonal direction D3. A raised portion 27c of the magnetic pole connecting section 27 is engaged with a recess 29c of the non-wound portion to constitute the first magnetic pole portion (20A to 20C) from the magnetic pole main portion 29 and magnetic pole surface constitute portions of the magnetic pole connecting sections 27.

21 Claims, 11 Drawing Sheets

LINEAR MOTOR

BACKGROUND OF THE INVENTION

The present invention relates to a linear motor.

A linear motor which includes a stator and a movable element linearly reciprocating along the stator comprises a plurality of permanent magnets arranged in one or two rows and an armature. Japanese Patent Publication No. 11-206100 discloses a linear motor which includes a stator provided with a magnetic pole row, and a movable element provided with an armature. The armature includes an armature core constituted by stacking a plurality of magnetic steel sheets, and a plurality of winding portions. The armature core includes a yoke extended in a moving direction of the movable element, and a plurality of magnetic pole portions which are extended toward the magnetic pole rows from the yoke and are wound with a winding conductor. Japanese Patent Publication No. 2002-176762 discloses a linear motor of a kind as shown in Japanese Patent Publication No. 11-206100, in which magnetic pole surface constituent portions, which are opposed to the magnetic pole row, of two adjacent magnetic pole portions are connected to each other. Japanese Patent Publication No. 2003-158864 discloses a linear motor of a kind as shown in Japanese Patent Publication No. 11-206100, in which a plurality of magnetic pole portions each include a plurality of first magnetic pole portions which are respectively provided with a wound portion wound with a winding conductor, and a plurality of second magnetic pole portions which are not wound with a winding conductor. The first magnetic pole portions and the second magnetic pole portions are extended in an opposing direction in which the stator and the movable element are opposed to each other, and are alternately arranged at a predetermined interval in a moving direction of the movable element so that the second magnetic pole portion is located on each end of the magnetic pole portion in the moving direction of the movable element.

However in the conventional linear motors described above, when dimensions of the linear motors are reduced in an orthogonal direction orthogonal to the moving direction and the opposing direction as previously described, a thickness of the magnetic pole portion is accordingly reduced, thereby reducing the magnetic fluxes which flow between the magnetic pole portion and the magnetic pole row. Consequently, a thrust force is reduced. Japanese Patent Publication No. 2001-8432 discloses a linear motor which comprises a magnetic pole portion including a wound portion which is wound with a winding conductor and a non-wound portion which is not wound with a winding conductor and is integrally provided at ends of the wound portion. A dimension of the non-wound portion in the orthogonal direction is defined larger than that of the wound portion in the orthogonal direction. With this arrangement, then magnetic fluxes which flow between the magnetic pole portion and the magnetic pole row is not reduced. Accordingly it is possible to suppress a reduction of the thrust force.

In the linear motor of Japanese Patent Publication No. 2001-8432, through holes through which screws or the like pass are formed in the armature core. The armature core is secured onto a movable stage which can be moved along the stator, with the screws passing through the through holes. In the linear motor of Japanese Patent Publication No. 2001-8432, the armature core is constituted by stacking a plurality of magnetic steel sheets formed in a predetermined shape, in the moving direction of the movable element. Therefore, in the linear motor of Japanese Patent Publication No. 2001-8432, the through holes are formed after stacking the plurality of magnetic steel palates, by cutting or other means in a direction orthogonal to the direction in which the magnetic steel sheets have been stacked. Thus, manufacturing the armature core is troublesome. In the linear motor of Japanese Patent Publication No. 2001-8432, a dimensional error is likely to be caused in an interval (slot pitch) between two adjacent magnetic pole portions of the armature core.

SUMMARY OF THE INVENTION

An object of the present invention is therefore to provide a linear motor for which an armature core can readily be manufactured without necessity of forming through holes, through which the screws or the like pass, in the armature core by cutting or other means.

Another object of the present invention is to provide a linear motor in which a dimensional error in a slot pitch between two adjacent magnetic pole portions can be reduced.

A further object of the present invention is to provide a linear motor capable of suppressing a reduction in the thrust force when a thickness of the magnetic pole portion is reduced.

Yet another object of the present invention is to provide a linear motor in which winding portions do not run out of the armature core, or run-out of the winding portions from the armature core can be reduced.

Still another object of the present invention is to provide a linear motor capable of reducing a cogging torque.

The present invention is directed to a linear motor including a stator and a movable element. A linear motor of the present invention comprises a magnetic pole row constituted from a plurality of permanent magnets arranged in a row, and an armature including an armature core and a plurality of winding portions. The armature core includes a plurality of first magnetic pole portions which are respectively provided with a wound portion wound with a winding conductor and a plurality of second magnetic pole portions which are not wound with the winding conductor. The first magnetic pole portions and the second magnetic pole portions are extended in an opposing direction in which the stator and the movable element are opposed to each other. The first magnetic pole portions and the second magnetic pole portions are alternately arranged at a predetermined interval in a moving direction of the movable element so that the second magnetic pole portion is located on each end of the armature core in the moving direction of the movable element. The winding portions which are wound with the winding conductor are provided at the first magnetic pole portions.

The first magnetic pole portions each include the wound portion which is wound with the winding conductor, a non-wound portion which is not wound with the winding conductor and integrally provided at each end of the wound portion, and a magnetic pole surface constituent portion which is connected to the non-wound portion and is opposed to the magnetic pole row.

The second magnetic pole portions each include a magnetic pole center portion which faces the wound portions of one or more of the first magnetic pole portions located adjacent to the second magnetic pole portion, a magnetic pole end portion which is integrally formed with the magnetic pole center portion at each end of the magnetic pole center portion and faces the non-wound portions of the one or more first magnetic pole portions located adjacent to the second magnetic pole portion, and a magnetic pole surface constituent portion which is integrally formed with the magnetic pole end portion and is opposed to the magnetic pole row.

The magnetic pole surface constituent portion of the first magnetic pole portion, and the magnetic pole surface constituent portion of the second magnetic pole portion that are located adjacent to each other are connected with a connecting portion. The magnetic pole surface constituent portion of the first magnetic pole portion, the second magnetic pole portion, and the connecting portion are integrally formed with one another. A dimension of the magnetic pole surface constituent portion of the first magnetic pole portion in an orthogonal direction orthogonal to the moving direction and the opposing direction is equal to a dimension of the second magnetic pole portion in the orthogonal direction. End surfaces of the wound portion of the first magnetic pole portion are located more inwardly in the orthogonal direction than end surfaces of the second magnetic pole portion. An armature core main portion except the wound portions and the non-wound portions of the first magnetic pole portions is constituted by stacking in the orthogonal direction a plurality of magnetic steel sheets formed in a predetermined shape. The stator is provided with one of the magnetic pole row and the armature, and the movable element is provided with the other of the magnetic pole row and armature.

In the linear motor of the present invention, cross sections of the armature core main portion, as taken in the orthogonal direction orthogonal to the moving direction of the movable element and the opposing direction in which the stator and the movable element are opposed to each other, of the armature core are of the same shape. Thus the armature core main portion can be constituted by stacking in the orthogonal direction a plurality of magnetic steel sheets formed in a predetermined shape. Since the through holes are formed in magnetic steel sheets so that the screws may pass all the way therethrough, it is not necessary to form through holes by cutting or other means after stacking the plurality of magnetic steel sheets. Accordingly the armature core can be readily manufactured. In addition, slot pitches between the first magnetic pole portions and the second magnetic pole portions which are located adjacent to each other can be constant, thereby reducing dimensional errors of the slot pitches.

The dimensions of the magnetic pole surface constituent portions of the first magnetic pole portions in the orthogonal direction orthogonal to the moving direction and the opposing direction are equal to the dimensions of the second magnetic pole portions in the orthogonal direction. End surfaces of the wound portion of the first magnetic pole portion are located more inwardly in the orthogonal direction than end surfaces of the second magnetic pole portion. The magnetic fluxes which flow between the first magnetic pole portion and the magnetic pole row are not reduced, since a dimension of the magnetic pole surface constituent portion of the first magnetic pole portion in the orthogonal direction is defined larger than a dimension of the wound portion in orthogonal direction. Thus the reduction of the thrust force of the linear motor can be suppressed. End surfaces of the wound portion of the first magnet pole portion are located more inwardly in the orthogonal direction than end surfaces of the second magnetic pole portion. Therefore, the winding portions do not run out of the armature core, or run-out of the winding portions from the armature core can be reduced.

In the linear motor of the present invention, the magnetic pole surface constituent portion of the first magnetic pole portion and the magnetic pole surface constituent portion of the second magnetic pole portion that are located adjacent to each other are connected with a connecting portion. In the linear motor of the present invention, slots are thus closed, thereby reducing the cogging torque.

The linear motor of the present invention can be adopted for various kinds of linear motors. For example, a linear motor including two magnetic pole rows and an armature interposed therebetween may be comprised as follows.

A plurality of first magnetic pole portions each include a wound portion which is wound with the winding conductor, a pair of non-wound portions which are not wound with the winding conductor and are integrally provided at ends of the wound portion, and a pair of magnetic pole surface constituent portions which are respectively connected to the non-wound portions and are respectively opposed to the pair of magnetic pole rows. The second magnetic pole portions which are not wound with the winding conductor each include a magnetic pole center portion which faces the wound portions of one or more of the first magnetic pole portions located adjacent to the second magnetic pole portion, a pair of magnetic pole end portions which are integrally formed with the magnetic pole center portion at ends of the magnetic pole center portion and face respectively the non-wound portions of the one or more first magnetic pole portions located adjacent to the second magnetic pole portion, and a pair of magnetic pole surface constituent portions which are integrally formed with the magnetic pole end portions and are respectively opposed to the magnetic pole rows.

The magnetic pole surface constituent portion of the first magnetic pole portion and the magnetic pole surface constituent portion of the second magnetic pole portion that are opposed to one of the magnetic pole rows and located adjacent to each other are connected with a connecting portion. The magnetic pole surface constituent portion of the first magnetic pole portion and the magnetic pole surface constituent portion of the second magnetic pole portion that are opposed to the other one of the magnetic pole rows and located adjacent to each other are connected with a connecting portion.

The magnetic pole surface constituent portion of the first magnetic pole portion, the second magnetic pole portion, and the connecting portion, all of which are opposed to the one of the magnetic pole rows, are integrally formed with one another. The magnetic pole surface constituent portion of the first magnetic pole portion, the second magnetic pole portion, and the connecting portion, all of which are opposed to the other one of the magnetic pole rows, are integrally formed with one another. A dimension of the magnetic pole surface constituent portion of the first magnetic pole portion in an orthogonal direction orthogonal to the moving direction and the opposing direction are equal to a dimension of the second magnetic pole portion in the orthogonal direction.

End surfaces of the wound portion of the first magnetic pole portion are located more inwardly in the orthogonal direction than end surfaces of the second magnetic pole portion. An armature core main portion except the wound portions and the non-wound portions of the first magnetic pole portions is constituted by stacking in the orthogonal direction a plurality of magnetic steel sheets formed in a predetermined shape. The stator is provided with one of the magnetic pole row and the armature, and the movable element is provided with the other of the magnetic pole row and armature.

With this arrangement, since the magnetic pole surface constituent portion of the first magnetic pole portion and the magnetic pole surface constituent portion of the second magnetic pole portion that are located adjacent to each other are connected with the connecting portion, the linear motor may comprise an armature core main portion which has been constituted by stacking in the orthogonal direction a plurality of magnetic steel sheets formed in a predetermined shape without using a large yoke.

The linear motor of this kind may be constituted so that the stator is provided with two magnetic pole rows and the movable element is provided with the armature. A movable stage which can be moved along the stator may be mounted at an end portion of the armature core main portion in the orthogonal direction. In this arrangement, the second magnetic pole portions are each formed with through holes through which the screws pass for securing the movable stage to the armature core main portion in the orthogonal direction. With this arrangement, the screws or the like pass through the through holes formed in each of the second magnetic pole portions, thereby securing the movable stage to the armature core main portion firmly.

The non-wound portion of the first magnetic pole portion and the magnetic pole surface constituent portion of the first magnetic pole portion which is connected thereto may be respectively shaped so that the non-wound portion may engage with the magnetic pole surface constituent portion by causing relative movement in the orthogonal direction between the non-wound portion and the magnetic pole surface constituent portion. In this arrangement, a magnetic pole main portion including the wound portion and the pair of non-wound portions of the first magnetic pole portion can be constituted by stacking in the orthogonal direction a plurality of magnetic steel sheets formed in a predetermined shape. With this arrangement, since the first magnetic pole portion and the magnetic pole surface constituent portion are engaged with a simple engaging structure, the first magnetic pole portion can be readily secured into the armature core main portion.

End surfaces of the non-wound portion of the first magnetic pole portion in the orthogonal direction are located more outwardly than end surfaces of the wound portion of the first magnetic pole portion in the orthogonal direction. Preferably a magnetic pole main portion including the wound portion and the pair of non-wound portions of the first magnetic pole portion is constituted by stacking in the moving direction a plurality of magnetic steel sheets formed in a predetermined shape. With this arrangement, since a dimension of the non-wound portion is defined larger than a dimension of the wound portion in the orthogonal direction, the magnetic fluxes which flow between the first magnetic pole portion and the magnetic pole row can readily flow through the non-wound portion. Therefore it is possible to effectively suppress the reduction of the thrust force.

Preferably the end surfaces of the non-wound portion are inclined so that a distance between the end surfaces in the orthogonal direction is reduced toward the wound portion from the magnetic pole surface constituent portion. With this arrangement, a weight of the first magnetic pole portion can be reduced. The magnetic fluxes do not readily flow in the vicinity of the wound portion on end surfaces of the non-wound portion. With this arrangement, the magnetic fluxes are not prevented from flowing there.

When the magnetic pole end portion is formed with the though hole through which the screw for securing movable state to the armature core main portion, a cross section of the magnetic pole end portion of the second magnetic pole portion, as taken so that a perpendicular line to the cross section may extend in the orthogonal direction, is shaped in such a manner that the cross section is widened toward both sides of the moving direction with respect to the magnetic pole center portion. With this arrangement, a cross-sectional area of the magnetic pole end portion can be increased. Therefore mechanical strength of the magnetic pole end portion can be maintained although the magnetic pole end portion is formed with the through hole.

In this arrangement, preferably a cross-sectional area of the wound portion of the first magnetic pole portion, as taken so that a perpendicular line to the cross section thereof may extend in the opposing direction, is equal to a cross-sectional area of the magnetic pole center portion of the second magnetic pole portion, as taken so that a perpendicular line to the cross section thereof may extend in the opposing direction. With this arrangement, a magnetic resistance of the wound portion of the first magnetic pole portion and a magnetic resistance of the magnetic pole center portion of the second magnetic pole portion can be equal, thereby suppressing a reduction of the thrust force.

Furthermore, preferably a width of the non-wound portion of the first magnetic pole portion as measured along the moving direction is equal to a width of a portion, which is opposed to the magnetic pole row, of the magnetic pole end portion of the second magnetic pole portion as measured along the moving direction. With this arrangement, the magnetic resistances on the surfaces, where the thrust forces are generated, of the first magnetic pole portions and that of the second magnetic pole portions vary in a regular periodic cycle. Therefore the cogging torque can be reduced.

The magnetic pole surface constituent portion of the first magnetic pole portion may include a raised portion which is raised toward the non-wound portion of the first magnetic pole portion and abuts onto the non-wound portion. In this arrangement, preferably the raised portion is formed in such a manner that a width of the raised portion as measured along the moving direction gradually becomes larger toward the non-wound portion. A width of the magnetic pole end portion opposed to the magnetic pole row, as measured along the moving direction, is equal to a width of a base portion of the raised portion as measured along the moving direction. A magnetic pole main portion including the wound portion and the pair of non-wound portions of the first magnetic pole portion is constituted by stacking in the orthogonal direction the plurality of magnetic steel sheets formed in a predetermined shape. With this arrangement, an area where the magnetic pole surface constituent portion of the first magnetic pole portion contacts the non-wound portion of the first magnetic pole portion can be increased. Since some space is left between the first magnetic pole portion and the armature core main portion when both portions are combined, a synthetic resin is filled thereinto. The synthetic resin covers around both of the raised portion and the non-wound portion to form a mold portion. The mold portion works to prevent the magnetic pole surface constituent portion and the non-wound portion of the first magnetic pole portion from moving. Since the width of the magnetic pole end portion opposed to the magnetic pole row, as measured along the moving direction, is equal to the width of the base portion of the raised portion as measured along the moving direction, the magnetic resistances on the surfaces, where the thrust forces are generated, of the first magnetic pole portions and that of the second magnetic pole portions vary in a regular periodic cycle. Therefore the cogging torque can be reduced.

The armature core may be constituted from a plurality of divided armature core units, which are arranged in the moving direction. Two adjacent units of the divided armature core units may be connected to each other with an engaging structure. With this arrangement, the armature including a desired number of magnetic pole portions can be obtained by combining the desired number of divided armature core units.

When the linear motor of the present invention is applied to a linear motor comprising a magnetic pole row and an armature opposing to one magnetic pole row, the linear motor may be constituted as follows.

The armature includes an armature core and a plurality of winding portions. The armature core comprises a yoke extended in a moving direction of a movable element, a plurality of first magnetic pole portions which are extended toward the magnetic pole row from the yoke and are respectively provided with the winding portions, and a plurality of second magnetic pole portions which are extended toward the magnetic pole row from the yoke and are not wound with the winding conductor. The first magnetic pole portions and the second magnetic pole portions are extended in an opposing direction in which a stator and a movable element are opposed to each other and alternately arranged at a predetermined interval in the moving direction of the movable element so that the second magnetic pole portion is located at each end of the armature core in the moving direction of the movable element. The winding portions are each constituted from a wound portion which is wound with the winding conductor, and are provided at the first magnetic pole portions.

The first magnetic pole portions each include a wound portion which is wound with the winding conductor, a non-wound portion which is not wound with the winding conductor and is integrally provided at each end of the wound portion, and a magnetic pole surface constituent portion which is connected to the non-wound portion located on the side of the magnetic pole row and is opposed to the magnetic pole row.

The second magnetic pole portions which are not wound with the winding conductor, each include a magnetic pole center portion which faces the wound portions of one or more of the first magnetic pole portions located adjacent to the second magnetic pole portion, a magnetic pole end portion which is integrally formed with the magnetic pole center portion at each end of the magnetic pole center portion and faces the non-wound portions, located on the side of the magnetic pole row, of the one or more first magnetic pole portions located adjacent to the second magnetic pole portion, and a magnetic pole surface constituent portion which is integrally formed with the magnetic pole end portion located on the side of the magnetic pole row and is opposed to the magnetic pole row.

The magnetic pole surface constituent portion of the first magnetic pole portion, and the magnetic pole surface constituent portion of the second magnetic pole portion that are opposed to the magnetic pole row and located adjacent to each other are connected with a connecting portion. The magnetic pole surface constituent portions of the first magnetic pole portions, the second magnetic pole portions, and the connecting portions are integrally formed with one another. Dimensions of the magnetic pole surface constituent portions of the first magnetic pole portions in an orthogonal direction orthogonal to the moving direction and the opposing direction are equal to dimensions of the second magnetic pole portions in the orthogonal direction. End surfaces of the wound portion of the first magnetic pole portion are located more inwardly in the orthogonal direction than end surfaces of the second magnetic pole portion. The armature core main portion except the wound portions and the non-wound portions of a magnetic pole main portion including the wound portion and the pair of non-wound portions of the first magnetic pole portion is constituted by stacking in the orthogonal direction a plurality of magnetic steel sheets formed in a predetermined shape. The stator is provided with one of the magnetic pole row and the armature, and the movable element is provided with the other of the magnetic pole row and armature.

With this arrangement, since the magnetic pole surface constituent portion of the first magnetic pole portion and the magnetic pole surface constituent portion of the second magnetic pole portion that are located adjacent to each other are connected to each other with the connecting portion, the armature core main portion for an armature core of a linear motor can be obtained by stacking in the orthogonal direction a plurality of magnetic steel sheets formed in a predetermined shape.

In the linear motor of this kind, the stator may be provided with the magnetic pole row, and the movable element may be provided with the armature. A movable stage which can be moved along the stator may be mounted onto an end portion of the armature core main portion in the orthogonal direction. In this arrangement, the armature core main portion is formed with the through holes through which the screws for securing the movable stage to the armature core main portion pass in the orthogonal direction. With this arrangement, the screws or the like can pass through the through holes in the armature core main portion to firmly secure the movable stage to the armature core main portion.

The non-wound portion, located on a side of the yoke, of the first magnetic pole portion and the yoke may be respectively shaped so that the non-wound portion located on the side of the yoke may engages with the yoke by causing relative movement in the orthogonal direction between the non-wound portion located on the side of the yoke and the yoke. The non-wound portion, located on the side of the magnetic pole row, of the first magnetic pole portion and the magnetic pole surface constituent portion may be respectively shaped so that the non-wound portion located on the side of the magnetic pole row may engage with the magnetic pole surface constituent portion by causing relative movement in the orthogonal direction between the non-wound portion located on the side of the magnetic pole row and the magnetic pole surface constituent portion. In this arrangement, a magnetic pole main portion including the wound portion and the pair of non-wound portions of the first magnetic pole portion may be constituted by stacking in the orthogonal direction a plurality of magnetic steel sheets formed in a predetermined shape. With this arrangement, the non-wound portions of the first magnetic pole portions can be engaged with the yoke and the magnetic pole surface constituent portions with a simple engaging structure. Thus, the first magnetic pole portions can be readily secured into the armature core main portion.

Preferably end surfaces of the non-wound portion, located on the side of the magnetic pole row, of the first magnetic pole portion in the orthogonal direction are located more outwardly than end surfaces of the wound portion of the first magnetic pole portion in the orthogonal direction. Preferably, a magnetic pole main portion including the wound portion and the pair of non-wound portions of the first magnetic pole portion by stacking in the moving direction a plurality of magnetic steel sheets formed in a predetermined shape. With this arrangement, since a dimension of the non-wound portion located on the side of the magnetic pole row may be defined larger than that of the wound portion in the orthogonal direction, the magnetic fluxes which flow between the fist magnetic pole portion and the magnetic pole row can readily flow through the non-wound portion located on the side of the magnetic pole row, thereby effectively suppressing a reduction of the thrust force.

Preferably the end surfaces of the non-wound portion located on the side of the magnetic pole row are inclined so that a distance between the end surfaces in the orthogonal direction is reduced toward the wound portion from the magnetic pole surface constituent portion. With this arrangement, the weight of the first magnetic pole portion can be reduced. The magnetic fluxes do not readily flow in the vicinity of the wound portion on end surfaces of the non-wound portion located on the side of the magnetic pole row. In this arrangement, the magnetic fluxes are not prevented from flowing there.

When through holes for securing a movable stage to the armature core main portion are respectively formed in the magnetic pole end portions located on the side of the magnetic pole row, preferably a cross section of the magnetic pole end portion, located on the side of the magnetic pole row, of the second magnetic pole portion, as taken so that a perpendicular line to the cross section may extend in the orthogonal direction, is shaped in such a manner that the cross section is widened toward both sides of the moving direction with respect to the magnetic pole center portion. With this arrangement, the cross-sectional area of the magnetic pole end portion located on the side of the magnetic pole row can be increased. Therefore mechanical strength of the magnetic pole end portion located on the side of the magnetic pole row can be maintained when the through hole is formed in the magnetic pole end portion located on the side of the magnetic pole row.

Preferably a cross-sectional area of the wound portion of the first magnetic pole portion, as taken so that a perpendicular line to the cross section thereof may extend in the orthogonal direction, is equal to a cross-sectional area of the magnetic pole center portion of the second magnetic pole portion, as taken so that a perpendicular line to the cross section thereof may extend in the orthogonal direction. With this arrangement, the magnetic resistance of the wound portion of the first magnetic pole portion and that of the magnetic center portion of the second magnetic pole portion can be equal, thereby suppressing a reduction of the thrust force.

Furthermore, the width of the non-wound portion, located on the side of the magnetic pole row, of the first magnetic pole portion as measured along the moving direction is preferably equal to the width of a portion, which is opposed to the magnetic pole row, of the magnetic pole end portion, located on the side of the magnetic pole row, of the second magnetic pole portion as measured along the moving direction. With this arrangement, the magnetic resistances on the surfaces, where the thrust forces are generated, of the first magnetic pole portions and that of the second magnetic pole portions vary in a regular periodic cycle. Therefore the cogging torque can be reduced.

The magnetic pole surface constituent portion of the first magnetic pole portion may include a raised portion which is raised toward the non-wound portion, located on the side of the magnetic pole row, of the first magnetic pole portion and abuts onto the non-wound portion located on the side of the magnetic pole row. Preferably the raised portion is formed in such a manner that the width of the raised portion as measured along the moving direction gradually becomes larger toward the non-wound portion located on the side of the magnetic pole row. A width of the magnetic pole end portion opposed to the magnetic pole row, as measured along the moving direction, is equal to a width of the base portion of the raised portion as measured along the moving direction. A magnetic pole main portion including the wound portion and the pair of non-wound portions of the first magnetic pole portion are constituted by stacking in the orthogonal direction a plurality of magnetic steel sheets formed in a predetermined shape. With this arrangement, an area where the magnetic pole surface constituent portion of the first magnetic pole portion contacts the non-wound portion, located on the side of the magnetic pole row, of the first magnetic pole portion can be increased. Since some space is left between the first magnetic pole portion and the armature core main portion when both portions are combined, a synthetic resin is filled thereinto. The synthetic resin covers around both of the raised portion and the non-wound portion to form a mold portion. The mold portion works to prevent the magnetic pole surface constituent portion and the non-wound portion of the first magnetic pole portion from moving. Since the width of the magnetic pole end portion opposed to the magnetic pole row, as measured along the moving direction, is equal to the width of the base portion of the raised portion as measured along the moving direction, the magnetic resistances on the surfaces, where the thrust forces are generated, of the first magnetic pole portions and that of the second magnetic pole portions vary in a regular periodic cycle. Therefore the cogging torque can be reduced The armature core may be constituted from a plurality of divided armature core units, which are arranged in the moving direction and two adjacent units of the divided armature core units may be connected to each other with an engaging structure. With this arrangement, the armature including a desired number of the magnetic pole portions can be obtained by combining the desired number of divided armature core units.

In the linear motor of the present invention, the cross sections of the armature core main portion, as taken in an orthogonal direction (an orthogonal direction orthogonal to a moving direction of the movable element and an opposing direction in which the stator and the movable element are opposed to each other), are of the same shape. Accordingly the armature core main portion may be constituted by stacking in the orthogonal direction a plurality of magnetic steel sheets formed in a predetermined shape. Since through holes are formed in magnetic steel sheets so that screws may pass all the way therethrough, it is not necessary to form through holes by cutting or other means after stacking the plurality of magnetic steel sheets. Thus the armature core can be manufactured readily. In addition, a slot pitch between first magnetic pole portion and the second magnetic pole portion that are located adjacent to each other can be constant, thereby reducing dimensional errors in the slot pitches.

A dimension of the magnetic pole surface constituent portion of the first magnetic pole portion in the orthogonal direction is equal to a dimension of the second magnetic pole portion. End surfaces of the wound portion of the first magnetic pole portion are located more inwardly in the orthogonal direction than end surfaces of the second magnetic pole portion. Therefore the magnetic fluxes which flow between the first magnetic pole portion and the magnetic pole row are not reduced, since the dimension of the magnetic pole surface constituent portion of the first magnetic pole portion in the orthogonal direction is defined larger than the dimension of the wound portion in orthogonal direction. Thus a reduction of a thrust force of the linear motor can be suppressed. End surfaces of the wound portion of the first magnet pole constituent portion are located more inwardly in the orthogonal direction than end surfaces of the second magnetic pole portion. Therefore, the winding portions do not run out of the armature core, or run-out of the winding portions from the armature core can be reduced.

In the linear motor of the present invention, the magnetic pole surface constituent portion of the first magnetic pole portion and the magnetic pole surface constituent portion of the second magnetic pole portion that are located adjacent to each other are connected with a connecting portion. In the linear motor of the present invention, slots are thus closed, thereby reducing the cogging torque.

DETAILED DESCRIPTION OF PREFERRED EMBODIMENTS

Figure 1:
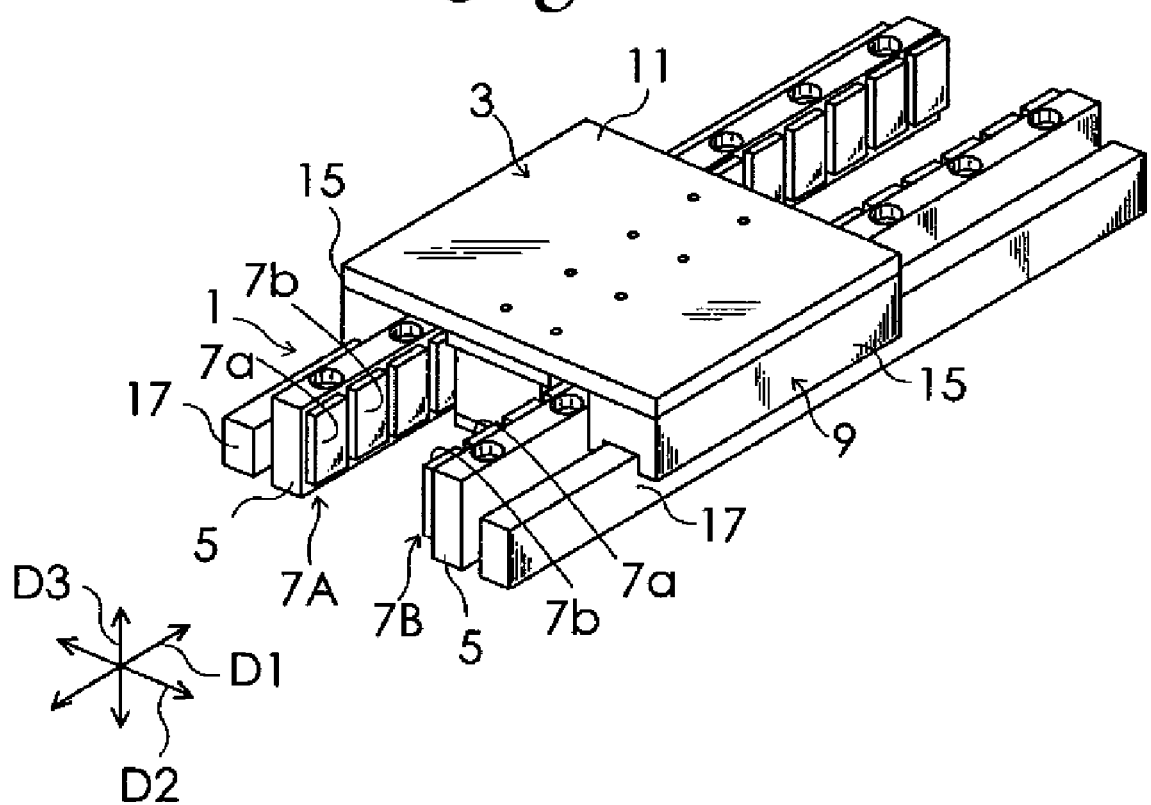
FIG. 1 is a perspective view of a linear motor according to a first embodiment of the present invention.

Embodiments of the present invention will be described below in detail with reference to drawings. FIG. 1 shows a perspective view of a linear motor of the first embodiment according to the present invention. As shown in FIG. 1, a linear motor according to this embodiment includes a stator 1 and a movable element 3. The stator 1 includes two magnetic pole rows 7A, 7B respectively arranged on two bases 5. The magnetic pole rows 7A, 7B are constituted from a plurality of permanent magnets 7a of N pole and a plurality of permanent magnets 7b of S pole that are alternately arranged therein. The two magnetic pole rows 7A, 7B are arranged side by side so that the permanent magnets 7a and the permanent magnets 7b are respectively opposed to each other.

Figure 2:
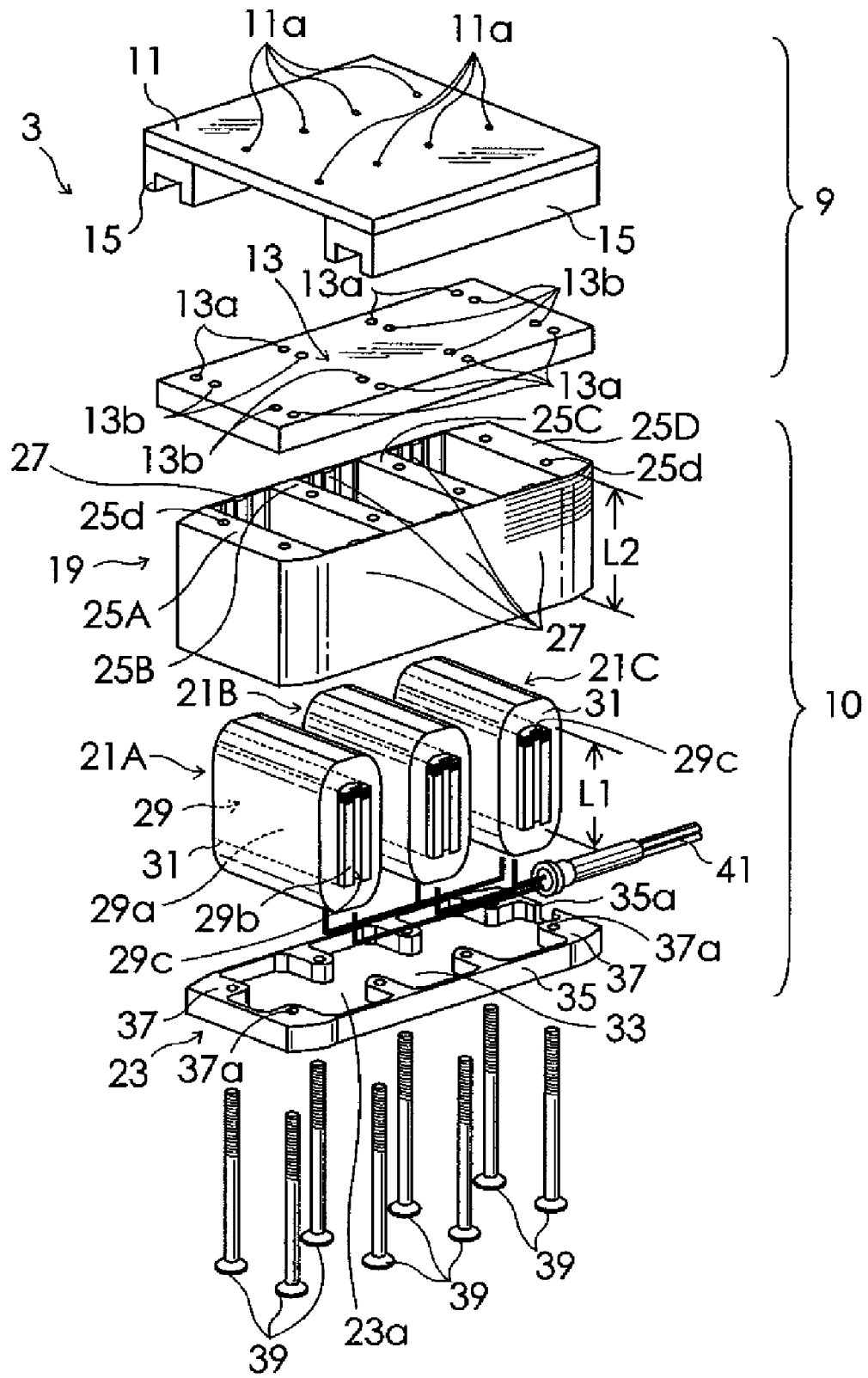
FIG. 2 is an exploded perspective view of a movable element used for the linear motor according to the first embodiment of the present invention.

As shown in an exploded perspective view of FIG. 2, the movable element 3 is provided with an armature 10 secured to a movable stage 9 which can be moved along the stator 1, and is located between the two magnetic rows 7A, 7B.

The movable stage 9 includes a stage body 11, a mounting plate 13 and two sliders 15. The stage body 11 is formed in a rectangle-plate shape, and formed with eight through holes 11a passing therethrough in a thickness direction thereof. The mounting plate 13 is formed with eight screw holes 13b for mounting the stage body 11 and eight screw holes 13a for mounting the armature 10. The stage body 11 and the mounting plate 13 are secured to each other with screws which pass through the through holes 11a and are screwed into the screw holes 13b for mounting a stage body 11. The armature 10 is secured to the mounting plate 13 with the screws 39 as described later. As shown in FIG. 1, the movable stage 9 is slidably supported by two side rails 17 which are located at outer side of the two bases 5. In this embodiment, the stage body 11 is provided with the two sliders 15, which are slidably disposed on the side walls 17. With this arrangement, the armature 10 can reciprocate in an extending direction of the two magnetic pole rows 7A, 7B. Accordingly the extending direction of the two magnetic poles 7A, 7B is defined a moving direction D1 of the movable element 3.

Figure 3:
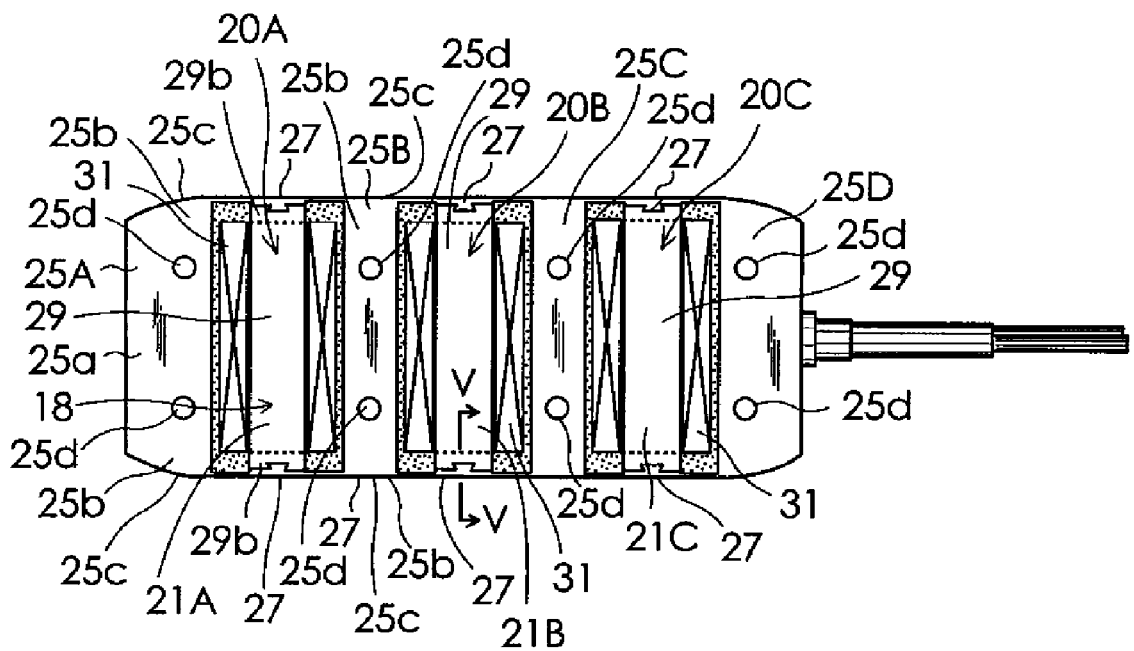
FIG. 3 is a top plan view of the movable element used for the linear motor according to the first embodiment of the present invention, wherein a movable stage is omitted from the illustration.

As shown in FIG. 2, the armature 10 includes an armature core main portion 18 and the winding portions 31. The armature core 18 includes, three first magnetic pole portions 20A to 20C and four second magnetic pole portions 25A to 25D. In this embodiment, the armature 10 includes an armature core main portion 19. Three first magnetic pole constituent component 21A to 21C and a covering member 23. Each of the first magnetic pole constituent pole main portion 29 and the winding portion 31. The armature core main portion 19 has four second magnetic pole portions 25A to 25D and six magnetic pole connecting sections 27. The armature core main portion 19 is constituted by stacking a plurality of magnetic steel sheets formed in a predetermined shape (refer to FIG. 1) in an orthogonal direction D3 orthogonal to the moving direction D1 and an opposing direction D2 in which the stator and the movable element are opposed to each other. Each of the second magnetic pole portions 25A to 25D constitutes a magnetic pole portion which is not wound with a winding conductor. The four second magnetic pole portions 25A to 25D are extended in the opposing direction D2 and are spaced in the moving direction D1. A distance between a pair of second magnetic pole constituent surfaces, of each of the second magnetic portions 25A, 25D, opposing to each other in the opposing direction D2 is respectively being reduced outwardly in the moving direction D1. In FIG. 3 (a plan view of the movable element 3, wherein a movable stage 9 is omitted from the illustration), more reference numerals are given to the second magnetic portions 25A, 25B for more detailed explanation. Each of the second magnetic pole portions 25A to 25D includes a magnetic pole center portion 25a, a pair of magnetic pole end portions 25b, and a pair of the magnetic pole surface constituent portions 25c. The magnetic pole center portion 25a faces a winding portion 31 of the adjacent first magnetic pole portion 20A to 20C, as described later. The pair of magnetic pole end portions 25b are integrally formed with the magnetic pole center portion 25a, respectively disposed at each end of the magnetic pole center portion 25a, and face non-wound portions 29b of the adjacent first magnetic pole portions. The pair of magnetic pole surface constituent portions 25c are integrally formed with the magnetic pole end portions 25bv respectively, and are opposed to the two magnetic pole rows 7A, 7B respectively. Eight through holes 25d passing through the second magnetic pole portions 25A to 25D in the orthogonal direction D3 are formed in the magnetic pole center portions.

Figure 4:
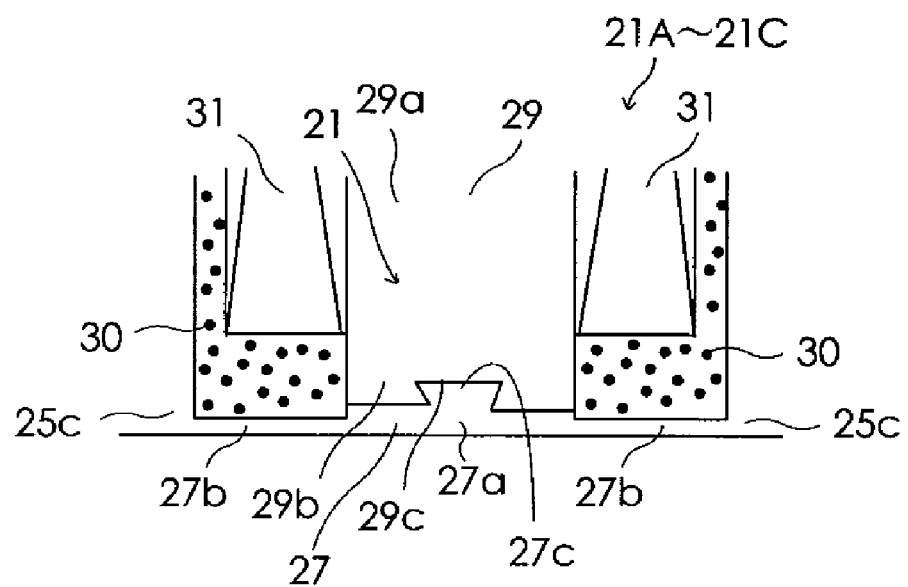
FIG. 4 is a partially enlarged view of FIG. 3.

Magnetic pole connecting sections 27 connect the magnetic pole end portions 125b of adjacent two second magnetic pole portions of the second magnetic pole portions 25A to 25D. As shown in a partially enlarged view of FIG. 4, one magnetic pole connecting section 27 includes a magnetic pole surface constituent portion 27a of the first magnetic pole portion 20A to 20C, and two connecting portions 27b. A inner surface of the magnetic pole surface constituent portion 27a facing the magnetic pole main portion 29 of the first magnetic pole constituent component 21 is located closer to the first magnetic pole constituent component (21A to 21C) than inner surfaces of the two connecting portions 27b facing the first magnetic pole constituent component (21A to 21C). The magnetic pole surface constituent portion 27a has a raised portion 27c which is raised toward the first magnetic pole main portion 29 and is extended in the orthogonal direction D3. The connecting portions 27b respectively connect the magnetic pole surface constituent portion 27a of the first magnetic pole portion (21A to 21C) and the magnetic pole surface constituent portion 25c of the second magnetic pole portion (25A to 25D) that are located adjacent to each other.

More reference numerals are given to the first magnetic pole constituent component 21A of FIG. 2 for more detailed explanation. Each of three first magnetic pole constituent components 21A to 21C includes the magnetic pole main portion 29 and the winding portion 31. The magnetic pole main portion 29 is constituted by stacking a plurality of magnetic steel sheets formed in a predetermined shape, in the orthogonal direction D3 (the same as the orthogonal direction D3 in which the magnetic steel sheets are stacked for the armature core main portion 19). The magnetic pole main portion 29a includes a wound portion 29a which is wound with a winding conductor, and a pair of non-wound portions 29b which are integrally formed with the wound portion 29a at both ends of the wound portion 29a, and are not wound with a winding conductor. End surfaces of the wound portions 29a of the first magnetic pole constituent component (21A to 21C) in the orthogonal direction D3 are located more inwardly than end surfaces of the second magnetic pole portions 25A to 25D in the orthogonal direction D3. In other words, a dimension L1 of the wound portion 29a of each of the first magnetic pole constituent components 21A to 21C in the orthogonal direction D3 is shorter than a dimension L2 of each of the second magnetic pole portions 25A to 25D in the orthogonal direction. At an end portion of the non-wound portion 29b, a recess 29c is formed, being open toward the magnetic pole surface constituent portion 27a and toward both side of the orthogonal direction D3 and extending in the orthogonal direction D3. The raised portion 27c of the armature core main portion 19 engages with the recess 29c by causing movement in the orthogonal direction D3 between the non-wound portion 29b and the magnetic pole surface constituent portion 27a. Synthetic resin 30 is filled into a space between the armature core main portion 19 and each of the pole magnetic constituent components 21A to 21C. With this arrangement, the three pole magnetic constituent components 21A to 21C are secured to the armature core main portion 19. Thus, the first magnetic pole portions 20A to 20C are respectively constituted from the magnetic pole main portions 29 of the three first magnetic pole constituent components 21A to 21C, and the pair of magnetic pole surface constituent portions 27a of the three first magnetic pole components 21A to 21C. The three first magnetic pole portions 20A to 20C which are respectively provided with the wound portion 29a wound with the winding conductor and the four second magnetic pole portions 25A to 25D which are not wound with the winding conductor are alternately arranged at a predetermined interval in the moving direction D1. The second magnetic pole portions 25A, 25D are located on each end of the armature core 18 in the moving direction D1 of the movable element. In this embodiment, the armature core 18 includes the armature core main portion 19, and the magnetic pole main portions 29 of the first magnetic pole constituent components 21A to 21C.

The winding portion 31 is wound on the wound portion 29a of the magnetic pole main portion 29. In this embodiment, AC currents of a U phase, a V phase and a W phase respectively flow through the winding portions 31 of the first magnetic pole constituent components 21A to 21C.

A covering member 23 is secured to an end portion opposing to the other end portion onto which the movable stage 9 of the armature 10 is secured. The covering member 23 includes a bottom plate portion 33, side wall portions 35 which are raised from each edge of the bottom portion 33, and eight rib portions 37 which are respectively extended from the side wall portions 35. Eight through holes 37a which respectively communicate with the through holes 25d of the armature 10 are respectively formed in eight rib portions 37. The armature 10 is secured to the mounting plate 13 of the movable stage 9 with screws 39 which pass all the way through the through holes 37a of the covering member 23 and the through holes 25d of the armature 10 and then threadably fit into the screw holes 13a for mounting the armature in the mounting plate 13 of the movable stage 9. The covering member 23 is formed with an internal space 23a therein which is surrounded by the bottom plate portion 33, the side wall portions 35, and the eight rib portions 37, and a notch hole 35a is formed in one of the side wall portions 35. A lead wire 41 is guided through the notch hole 35a into the internal space 23a, and is connected to each of three winding portions 31. The depressed portion 23a is filled with the synthetic resin 30, with the lead wire 41 arranged therein.

Figure 5:
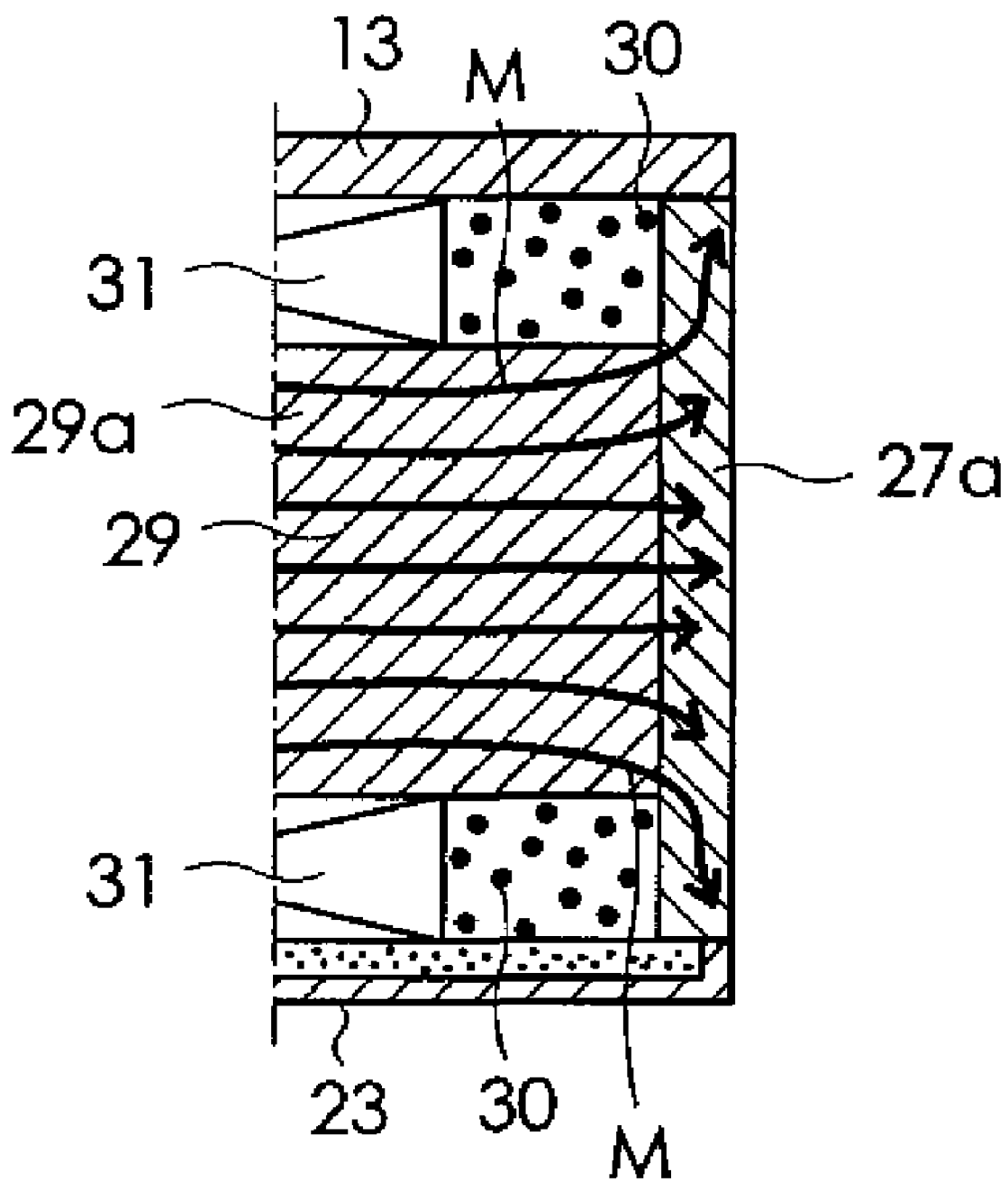
FIG. 5 is a cross sectional view as taken along line V-V.

In the linear motor according to this embodiment of the present invention, cross sections of the armature core main portion 19, as taken along the orthogonal direction D3, of the armature core are of the same shape. Thus the armature core main portion 19 can be constituted by stacking in the orthogonal direction the plurality of magnetic steel sheets formed in a predetermined shape. Since the through holes 25d are formed in magnetic steel sheets so that the screws 39 may pass all the way therethrough, it is not necessary to form through holes by cutting or other means after stacking the plurality of magnetic steel sheets. Thus the armature core can be manufactured easily. In addition slot pitches between the first magnetic pole portions 20A to 20C and the second magnetic pole portions 25A to 25D, which are located adjacent to each other, can be constant, thereby reducing dimensional errors of the slot pitches. A dimension of the magnetic pole surface constituent portion 27a of the first magnetic pole portion 20A to 20C in the orthogonal direction D3 is equal to that of each of the second magnetic pole portions 25A to 25D. End surfaces of the wound portion 29a of each of the first magnetic pole portions 20A to 20C are located more inwardly in the orthogonal direction D3 than end surfaces of each of the second magnetic pole portions 25A to 25D. In other words, a dimension L1 of the wound portion 29a of each of the first magnetic pole portions 20A to 20C in the orthogonal direction D3 is shorter than a dimension L2 of each of the second magnetic pole portions 25A to 25D. As shown in FIG. 5 (a cross section as taken along the line IV-IV in FIG. 3), the magnetic fluxes M which flow between the two magnetic pole rows 7A, 7B are not reduced, since the dimension of the magnetic pole surface constituent portion 27a of the first magnetic pole portion (20A to 20C) in the orthogonal direction is set longer than that of the wound portion 29a in orthogonal direction D3. Thus a reduction of the thrust force of the linear motor can be suppressed. End surfaces of the wound portion 29a of each of the first magnetic pole portions 20A to 20C are located more inwardly in the orthogonal direction D3 than end surfaces of each of the second magnetic pole portions 25A to 25D. Therefore, the winding portion 31 does not run out of the armature core 18, or run-out of the winding portion 31 from the armature core 18 can be reduced.

Figure 6:
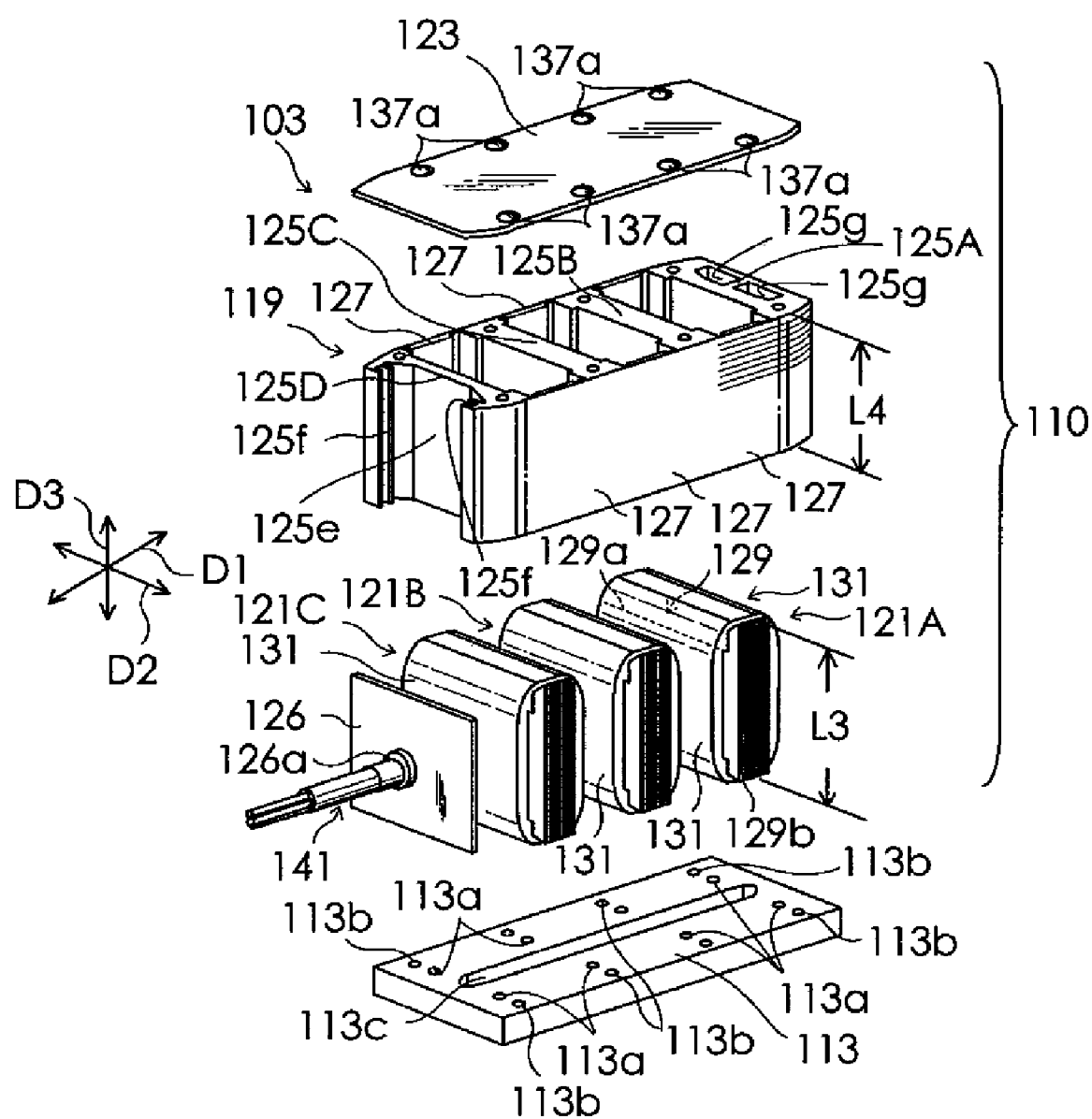
FIG. 6 is an exploded perspective view of a movable element to be used for a linear motor according to a second embodiment of the present invention.

FIG. 6 is an exploded perspective view of a movable element 103 which is used in the second embodiment. For better understandings, the movable element 103 is shown with turned over in an orthogonal direction D3 in FIG. 6. The linear motor, except an armature 110 and a mounting board 113 of a movable stage 109 and a covering member 123, in this embodiment has the same structure as that of the linear motor in the first embodiment as shown in FIG. 1 and FIG. 5. The mounting plate 113 of the movable stage 109 of the linear motor in the second embodiment is formed with eight screw holes 113a for mounting the stage body and eight screw holes 113b for mounting the armature. The mounting board 113 is formed, at a center thereof, with a groove portion 113c which is extended in a moving direction D1 of the movable element 103 and opened toward the armature 110.

An armature core main portion 119 of the armature core 118 (FIG. 7) has four second magnetic pole portions 125A to 125D and six magnetic pole connecting sections 127. The armature core main portion 119 is constituted by stacking a plurality of magnetic steel sheets formed in a predetermined shape in the orthogonal direction D3 orthogonal to an opposing direction D2 in which the stator and the movable element are opposed to each other. A distance between a pair of second magnetic pole constituent surfaces, of each of the second magnetic portions 125A, 125D, opposing to each other in the opposing direction D2 is being reduced outwardly in the moving direction D1. The second magnetic pole portion 125A is formed with two guiding passes 125g passing therethrough in the orthogonal direction D3, at an end portion thereof outwardly in the moving direction D1. Other second magnetic pole portion 125D is formed with a depressed portion 125e opened outwardly in the moving direction D1 and in both directions of the orthogonal direction D3, and communicates with the groove portion 113c located on the mounting board 113. The depressed portion 125e of the second magnetic pole portion 125D is formed with a pair of recessed portions 125f extended in the orthogonal direction D3, at each side of an opening portion thereof in the moving direction D1. The pair of recessed portions 125f are respectively engaged with edge portions of a covering plate 126. The covering plate 126 is shaped and measured to cover the opening portion of the depressed portion 125e in the moving direction D1, and formed with a through hole 126a through which a lead wire 141 is guided at a center thereof, as described later. In a plan view of the movable element 103 of FIG. 7, wherein a movable stage is omitted from the illustration, more reference numerals are given to the second magnetic portions 125A, 125B for more detailed explanation. Each of the second magnetic pole portions 125A to 125D includes a magnetic pole center portion 125a, a pair of magnetic pole end portions 125b, and a pair of magnetic pole surface constituent portions 125c. The magnetic pole center portion 125a is located adjacent to a winding portion 131 of the first magnetic pole constituent component 121A to 121C as described later. The pair of magnetic pole end portions 125b are located adjacent to a pair of non-wound portions 129b of the first magnetic pole constituent component 121A to 121C. The pair of magnetic pole surface constituent portion 125c is integrally formed with the magnetic pole end portion 125b. A cross section of the magnetic pole end portion 125b, as taken along the moving direction D1 and the opposing direction D2, is shaped in such a manner that the cross section is widened toward both sides of the moving direction D1 with respect to the magnetic pole center portion 125a. The pole magnetic end portions 125b are formed with through holes 125d passing therethrough in the orthogonal direction D3.

There are six connecting sections 127. The connecting section 127 contacts the magnetic pole end portions 125b of two adjacent second magnetic pole portions of the second magnetic pole portions 125A to 125D. One magnetic pole connecting section 127 comprises a magnetic pole surface constituent portion 127a of the first magnetic pole portion (120A to 120C), and two connecting portions 127b. A surface, of the magnetic pole surface constituent portion 127a, facing the first magnetic pole constituent component 121 is located closer to the first magnetic pole constituent component 121 than inner surfaces, of the two connecting portions 127b, facing the first magnetic pole constituent component (121A to 121C). The two connecting portions 127b respectively connect the magnetic pole surface constituent portion 127a of the first magnetic pole portion (120A to 120C) and the magnetic pole surface constituent portion 125c of the second magnetic pole portion 125A to 125d that are located adjacent to each other.

Figure 7:
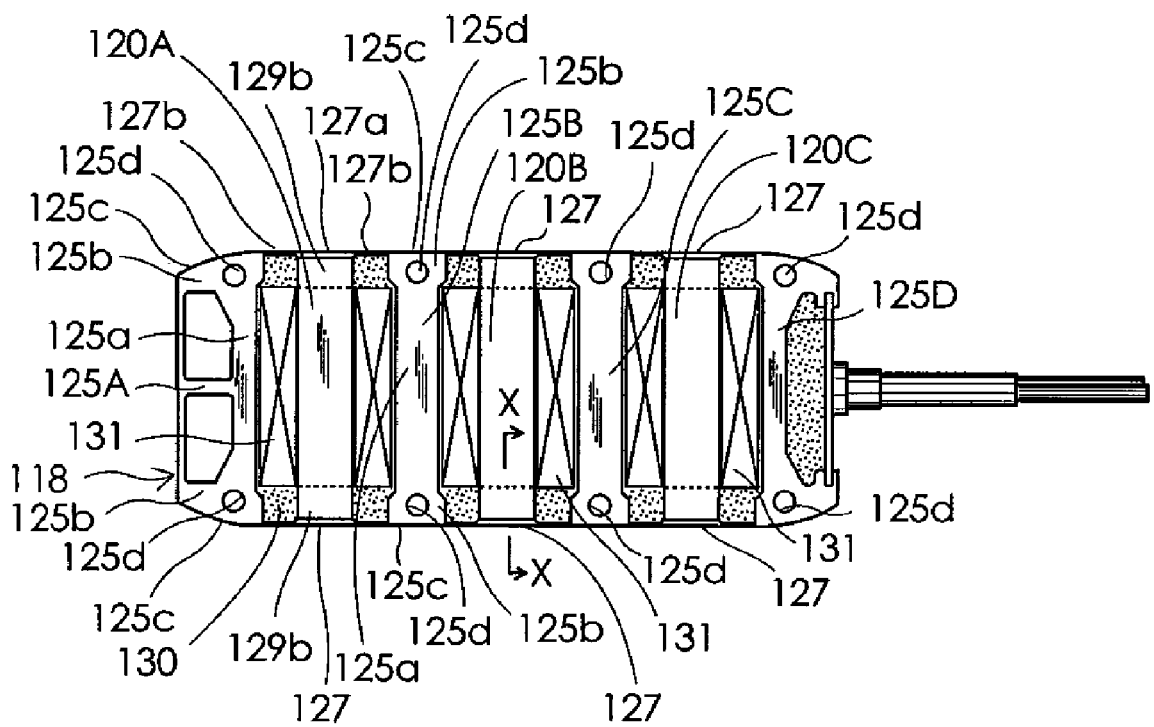
FIG. 7 is a cross-sectional view of a movable element used for the linear motor according to the second embodiment of the present invention, wherein a movable stage is omitted from the illustration.
Figure 8:
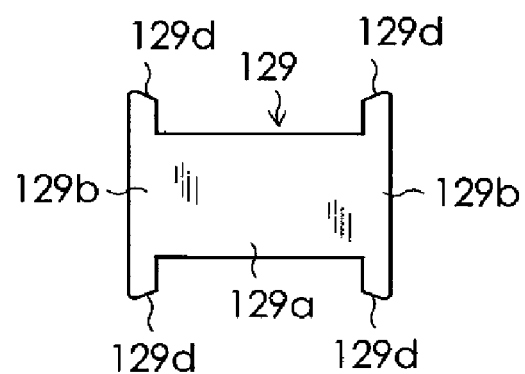
FIG. 8 is a view of a magnetic pole main portion of a first magnetic pole constituent component used for the linear motor, as viewed in a moving direction of the magnetic pole main portion, according to the second embodiment of the present invention.

More reference numerals are given to a magnetic pole constituent component 121A of FIG. 6 for more detailed explanation. Each of three first magnetic pole constituent components 121A to 121C includes a magnetic pole main portion 129 and a winding portion 131. The magnetic pole main portion 129 is constituted by stacking a plurality of magnetic steel sheets formed in a predetermined shape, in the moving direction D1 (a direction orthogonal to the orthogonal direction D3 in which the magnetic steel sheets are stacked for the armature core main portion 119). The magnetic pole main portion 129 includes a wound portion 129a which is wound with a winding conductor, and a pair of non-wound portions 129b which are integrally formed with the wound portion 129a at both ends of the wound portion 129a, and are not wound with a winding conductor. End surfaces of the wound portions 129a of the first magnetic pole constituent component (121A to 121C) in the orthogonal direction D3 are located more inwardly than end surfaces of the second magnetic pole portions 125A to 125D in the orthogonal direction D3. End surfaces of the non-wound portion 129b of the first magnetic pole portion are located outwardly more than end surfaces of the wound portion 129a of the first magnetic pole portion in the orthogonal direction D3. A dimension L3 of the non-wound portion 129b of the first magnetic pole portion is equal to a dimension L4 of each of the second magnetic pole portions 125A to 125D in the orthogonal direction D3. Therefore a magnetic pole main portion 129 of each of the first magnetic pole constituent portions 121A to 121C is formed in an H shape as viewed in the moving direction D1 as shown in FIG. 8. The end surfaces 129d of the non-wound portion 129b are inclined so that a distance between the end surfaces 129d in the orthogonal direction D3 is being increased from the wound portion 129a outwardly in the opposing direction D2. In other words, the end surfaces 129d of the non-wound portion 129b are inclined so that a distance between the end surfaces 129d in the orthogonal direction D3 is being reduced toward the wound portion 129a from the magnetic pole surface constituent portion 127a. As shown in FIG. 7, the non-wound portion 129b abuts onto the magnetic pole surface constituent portion 127a. Synthetic resin 130 is filled into a space between the divided core main portion 220 and each of the three first magnetic pole constituent components 121A to 121C to form a mold portion. Since the mold portion works to prevent the magnetic pole surface constituent portion and the non-wound portion of the first magnetic pole portion from moving, three first magnetic pole constituent components 121A to 121C are secured into the divided core main portion 120. Thus, the first magnetic pole portion (120A to 120C) is constituted from the magnetic pole main portions 129 of the first magnetic pole constituent components 121A to 121C, and the pair of magnetic pole surface constituent portions 127a. Three first magnetic pole portions 120A to 120C which are respectively provided with the wound portion 131 wound with a winding conductor and four second magnetic pole portions 125A to 125D which are not wound with the winding conductor are alternately arranged at a predetermined interval in the moving direction D1 so that the second magnetic pole portions 125A, 125D are located on each end of the armature core 118 in the moving direction D1 of the movable element 103.

The winding portion 131 is wound on the wound portion 129a of the magnetic pole main portion 129. In this embodiment as well as the first embodiment, AC currents of a U phase, a V phase and a W phase respectively flow through the winding portions 131 of the first magnetic pole constituent components 121A to 121C.

A covering member 123 is in a plate-like shape, and formed with eight through holes 137a which communicate with eight through holes 125d in the armature 110.

Figure 9:
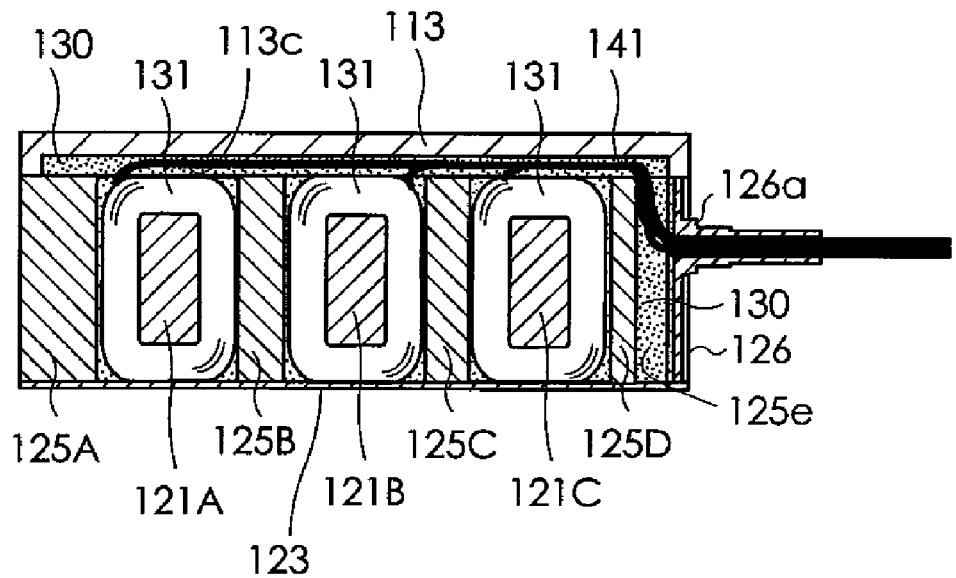
FIG. 9 is across-sectional view of the movable element used for the linear motor according to the second embodiment of the present invention.

In the linear motor according to this embodiment, a lead wire 141 is arranged as shown in FIG. 9. The lead wire 141 is guided to the depressed portion 125e of the second magnetic pole portion 125D and the groove portion 113c on the mounting plate 113 through the through hole 126a in the covering plate 126. The synthetic resin 130 is filled into the depressed portion 125e and the groove portion 113c.

Figure 10:
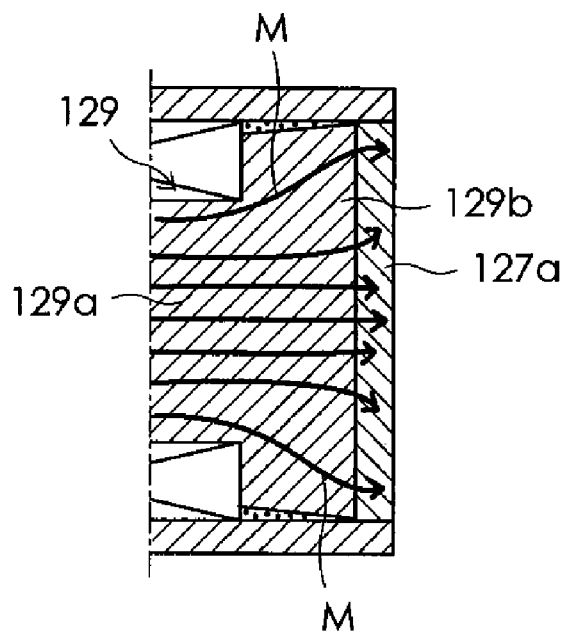
FIG. 10 is a cross-sectional view of FIG. 7 as taken along line X-X.

In the linear motor according to this embodiment, since end surfaces of the non-wound portion 129b of the first magnetic pole portion in the orthogonal direction D3 are located more outwardly than end surfaces of the wound portion 129a of the first magnetic pole portion in the orthogonal direction D3 as shown in FIG. 10, the magnetic fluxes M which flow between the first magnetic pole portions and the magnetic pole row can easily flow through the non-wound portion 129b. Therefore it is possible to effectively suppress a reduction of a thrust force. A cross section of the magnetic pole end portion 125b, as taken along the moving direction D1 and the opposing direction D2, is shaped in such a manner that the cross section is widened toward both sides of the moving direction D1 with respect to the magnetic pole center portion 125a. A cross-sectional area of the magnetic pole end portion 125b can thus be increased, and mechanical strength of the magnetic pole end portion 125b can be maintained, where the magnetic pole end portion 125b is formed with the through hole 125d.

Figure 11:
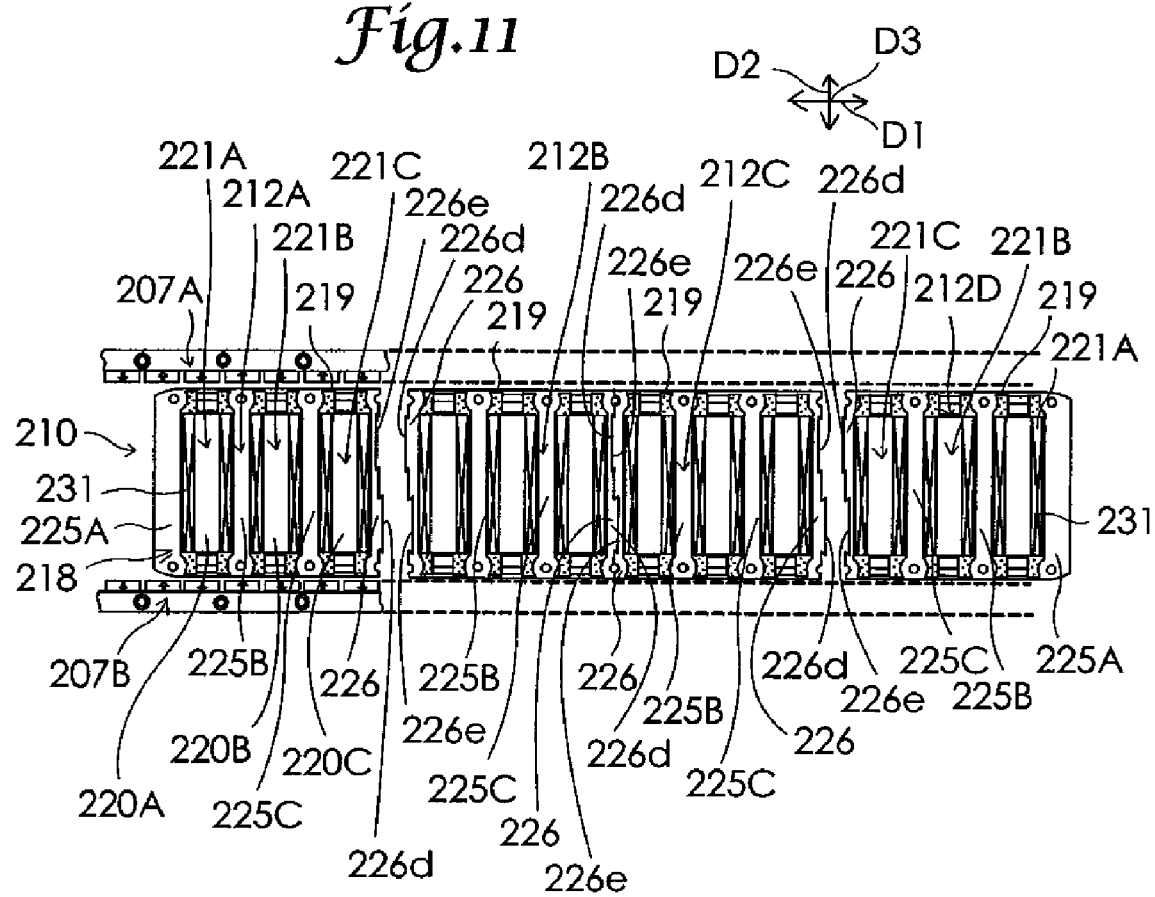
FIG. 11 is a top plan view of a linear motor according to a third embodiment of the present invention, wherein a movable stage is omitted from the illustration.
Figure 12:
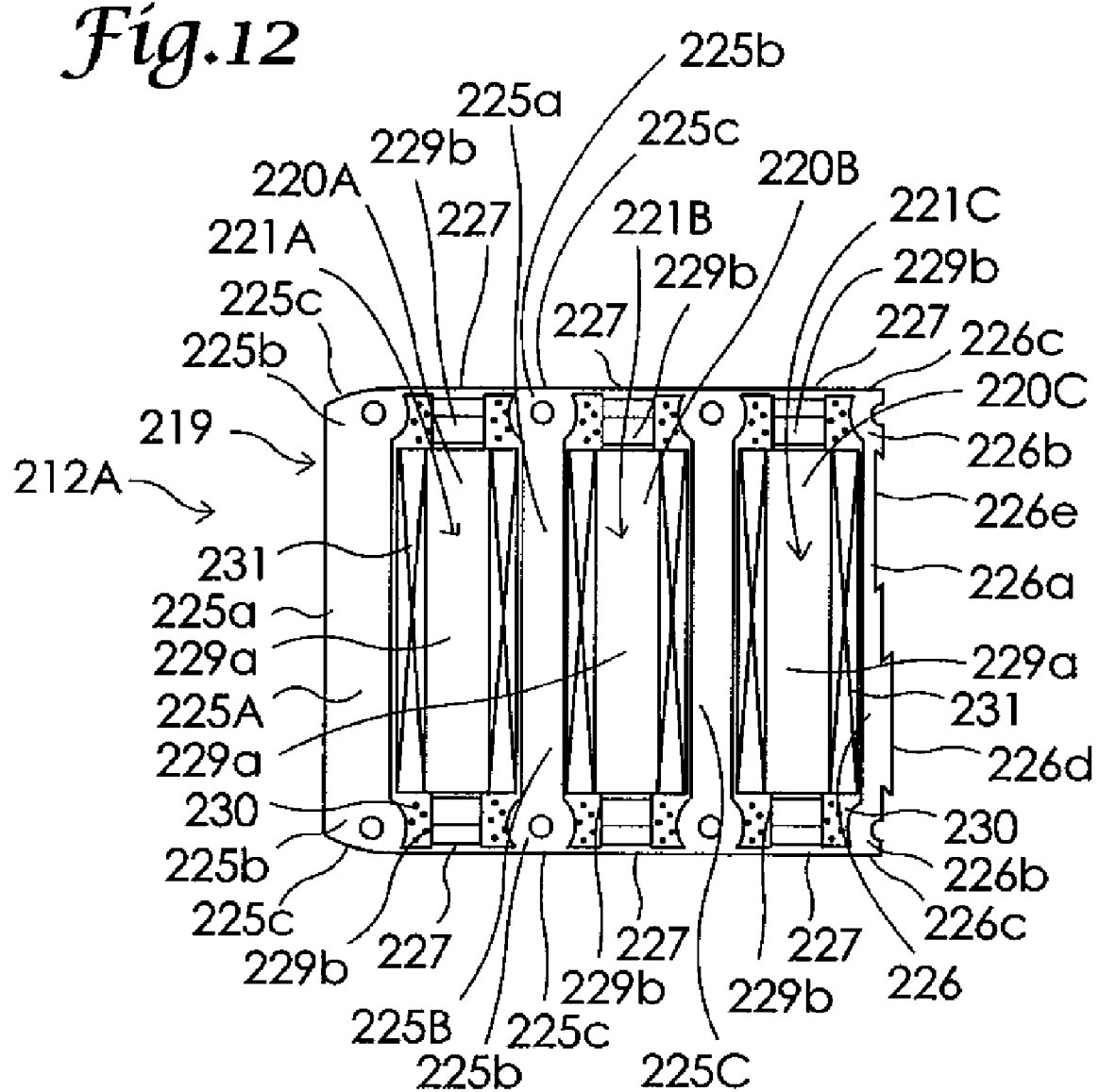
FIG. 12 is a top plan view of a divided armature core unit used for the linear motor according to the third embodiment of the present invention.
Figure 13:
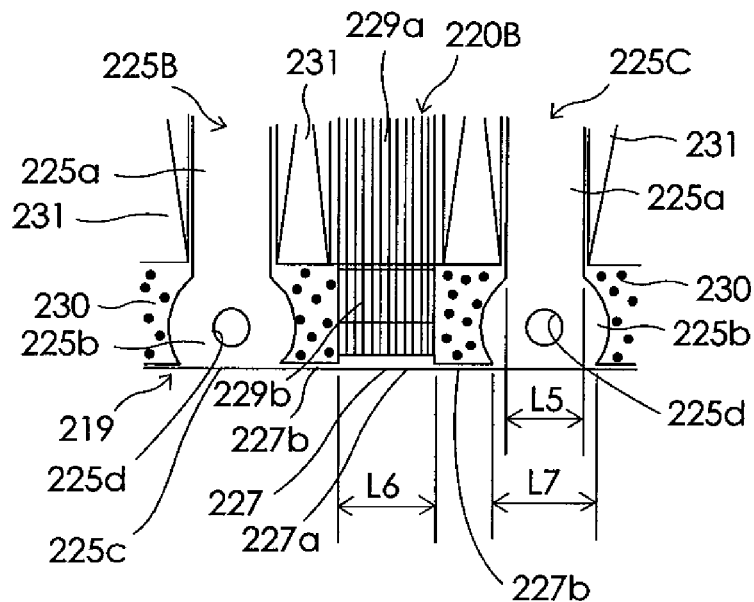
FIG. 13 is a partially enlarged view of FIG. 12.

FIG. 11 is a plan view of a linear motor in the third embodiment according to the present invention, wherein a movable stage is omitted from the illustration. The linear motor in this embodiment is constituted from four divided armature core units 212A to 212D which are connected to each other in the moving direction D1 with an engaging structure. One divided armature core unit (212A to 212D) except a divided core main portion unit 219 has the same structure as that of the armature 210 of the linear motor in the second embodiment. The movable element is shown in FIG. 11, wherein a movable stage is omitted from the illustration. The divided armature core units 212A, 212D which are located at each end of the armature core 218 in the moving direction D1 and the divided armature core units 212B, 212C which are located inside the armature core in the moving direction D1 are shown with unconnected to each other, while the divided armature core units 212B, 212C are shown with connected to each other. The divided armature core units 212A, 212D that are respectively located at each end of the armature core in the moving direction D1 have the same structure. In FIG. 12, more reference numerals are given to the divided magnetic core unit 212A for more detailed explanation. The divided armature core units 212A, 212D respectively include the divided core main portion 219 of the armature core 218 and three first magnetic pole constituent components 221A to 221C and a covering member (not shown). The divided core main portion 219 of the armature core 218 comprises three second magnetic pole portions 225A to 225C, a second magnetic pole half portion 226, and six magnetic pole connecting sections 227, and is formed by stacking in the orthogonal direction D3 a plurality of magnetic steel sheets in a predetermined shape. A distance between a pair of second magnetic pole constituent surfaces, of the second magnetic portion 225A, opposing to each other in the opposing direction D2 is being reduced outwardly in the moving direction D1. More reference numerals are given to the second magnetic portions 225A, 225B for more detailed explanation in FIG. 12. Each of the second magnetic pole portions 225A to 225D includes a magnetic pole center portion 225a, a pair of magnetic pole end portions 225b, and a pair of magnetic pole surface constituent portions 225c. The magnetic pole center portion 225a is located adjacent to a winding portion 231 of the first magnetic pole portion 220A to 220C as described later. The magnetic pole end portions 225b are integrally provided at ends of the magnetic pole center portion 225a, and face the pair of non-wound portions 229b of the first magnetic pole portion 220A to 220C located adjacent to each other. The magnetic pole surface constituent portions 225c are integrally formed with the magnetic pole end portions 225b, and are opposed to two magnetic pole rows 207A, 207B. As shown in a partial enlarged figure of FIG. 13, a cross section of the magnetic pole end portion 225b, as taken so that a perpendicular line to the cross section thereof may extend in the orthogonal direction D3, is shaped in such a manner that the cross section is widened toward both sides of the moving direction D1 with respect to the magnetic pole center portion 225a. The magnetic pole end portion 225b is formed with through hole 225d passing therethrough in the orthogonal direction D3. A width L5, as measured along the moving direction D1, of the magnetic pole center portion 225a of the second magnetic portions 225A to 225C is smaller than a width L6, as measured along the moving direction D1, of the non-wound portion 229b of the first magnetic portion (229, 227a), so that a cross-sectional area of the wound portion 229a of the first magnetic pole portion, as described later, as taken so that a perpendicular line to the cross section thereof may extend in the opposing direction D2, is equal to a cross-sectional area of the magnetic pole center portion 225a of the second magnetic pole portion (225A to 225C), as taken so that a perpendicular line to the cross section thereof may extend in the opposing direction D2. A width L7 of the magnetic pole end portion 225b of the second magnetic pole portions 225A to 225C, as measured along the moving direction D1 at a portion opposing to each of the two magnetic pole rows 207A, 207B, is equal to the width L6 of the first magnetic pole portion (220A to 220C), as previously described.

The second magnetic pole half portion 226 comprises a magnetic pole center half portion 226a, a pair of magnetic pole end half portion 226b and a pair of magnetic pole surface constituent half portions 226c. The magnetic pole center half portion 226a faces the winding portion 231 of the first magnetic pole constituent component 221. The pair of magnetic pole end half portion 226 face a pair of non-wound portion 229*b* of the first magnetic pole portion (220A to 220C). The magnetic pole surface constituent half portions 226*c* are integrally formed with the magnetic pole end portions 226*b* and oppose to two magnetic pole rows 207A, 207B. The magnetic pole center half portion 226*a* is formed with a raised portion 226*d* which is raised toward the divided armature core unit 212B and a depressed portion 226*e* which is opened in both directions of the orthogonal direction D3 and toward the divided armature core unit 212B. The raised portion 226*d* and the depressed portion 226*e* are arranged side by side in the opposing direction D2. The raised portion 226*d* is shaped so that a dimension is being increased in the opposing direction D2 toward the divided armature core unit 212B which is located adjacent thereto. The depressed portion 226*e* is shaped so that a dimension is being reduced in the opposing direction D2 toward the divided armature core unit 212B which is located adjacent thereto.

Magnetic pole connecting sections 227 connect the magnetic pole 225*b* end portions of two adjacent second magnetic pole portions of the second magnetic pole portions 225A to 225C. One magnetic pole connecting section 227 comprises a magnetic pole surface constituent portion 227*a* of the first magnetic pole portion, and two connecting portions 227*b*. A inner surface, of the magnetic pole surface constituent portion 227, facing the first magnetic pole constituent component 221 is located closer to the first magnetic pole constituent component 221 than a surface, of each of the two connecting portions 227*b*, facing the first magnetic pole constituent component 221. The connecting portion 227*b* connects the magnetic pole surface constituent portion 227*a* of the first magnetic pole portion (221A to 221C) and the magnetic pole surface constituent portion 225*c* of the second magnetic pole portion (225A to 225D, 226) that are located adjacent to each other.

Three first magnetic pole constituent components 221A to 221C respectively include magnetic pole main portion 229 and a winding portion 231. The magnetic pole main portion 229 is constituted by stacking a plurality of magnetic steel sheets formed in a predetermined shape, in the moving direction D1 (orthogonal to the orthogonal direction D3 in which the magnetic steel sheets are stacked for the divided core main portion 220). The magnetic pole main portion 229 includes a wound portion 229*a* which is wound with a winding conductor, and a pair of non-wound portions 229*b* which are integrally formed with the wound portion 229*a* at both ends of the wound portion 229*a* and are not wound with a winding conductor. The non-wound portion 229*b* abuts onto the magnetic pole surface constituent portion 227*a*. Synthetic resin 230 is filled into a space between the divided core main portion 220 and each of the three first magnetic pole constituent components 221A to 221C to form a mold portion. Since the mold portion works to prevent the magnetic pole surface constituent portion 227*a* and the non-wound portion 229*b* of the first magnetic pole portion (220A to 220C) from moving, three first magnetic pole constituent components 221A to 221C are secured into the divided core main portion 219. Thus, the first magnetic pole portion (220A to 220C) is constituted from the magnetic pole main portions 229 and the pairs of magnetic pole surface constituent portions 227*a* of the three first magnetic pole portions 221A to 221C. The three first magnetic pole portions 220A to 220C which are respectively provided with the winding portion 231, and the four second magnetic pole portions 225A to 225C and coupled second magnetic pole half portion 226 which are not wound with the winding conductor are alternately arranged at a predetermined interval in the moving direction D1, and the second magnetic pole portions 225A and the second magnetic pole half portion 226 are alternately located on each end of the armature core in the moving direction D1 of the movable element 203.

The winding portion 231 is provided at the wound portion 229*a* of the magnetic pole main portion 229. In this embodiment also, AC currents of a U phase, a V phase and a W phase respectively flow through the winding portions 231 of the first magnetic pole constituent components 221A to 221C.

The divided armature core unit 212B and the divided armature core unit 212C that are located inside the armature core in the moving direction D1 have the same structure. The divided armature core units 212B, 212C have the same structure as that of the divided armature core unit 212A except that the second magnetic pole half portion 226, instead of the second magnetic pole portion 225A in the divided armature core unit (212A, 212D), is arranged therein. In other words, the divided armature core units 212B, 212C have the same structure as that of the divided armature core unit 212A, except that the divided armature core units 212B, 212C are constituted so that the second magnetic pole half portions 226 are located at each end thereof in the moving direction D1.

The divided armature core units 212A to 212D are constituted so that the second magnetic pole portion 225A of the divided armature core unit 212A and the second magnetic pole portion 225A of the divided armature core unit 212D are respectively located at either end of the armature core in the moving direction D1, and connected to each other by engaging the raised portion 226*d* and the depressed portion 226*e* of the two adjacent divided armature core units.

According to the linear motor of this embodiment, since the armature 210 is constituted from the four divided armature core units 212A to 212D which are connected to each other in the moving direction D1 with an engaging structure, the armature including a desired number of magnetic pole portions can be obtained by combining the desired number of divided armature core units. A cross-sectional area of the wound portion 229*a* of the first magnetic pole portion (220A to 220C) is equal to a cross-sectional area of each of the magnetic pole center portions 225*a* of the second magnetic pole portions 225A to 225C, the magnetic resistance of the wound portion 229*a* of the first magnetic pole portion and that of the magnetic center portions of the second magnetic pole portion can be equal, thereby suppressing the reduction of the thrust force.

A dimension L7, in the moving direction D1, of a magnetic pole end portion 225*b* of each of the second magnetic pole portions 225A to 225C all of which respectively oppose to the two magnetic pole rows 207A, 207B is equal a dimension L6 of the non-wound portion 229*b* of each of the first magnetic pole portion (220A to 220C), the magnetic resistances on the surfaces, where the thrust forces are generated, of the first magnetic pole portions 220A to 220C and that of the second magnetic pole portions 220A to 220C vary in a regular periodic cycle. Therefore the cogging torque can be reduced.

Figure 14:
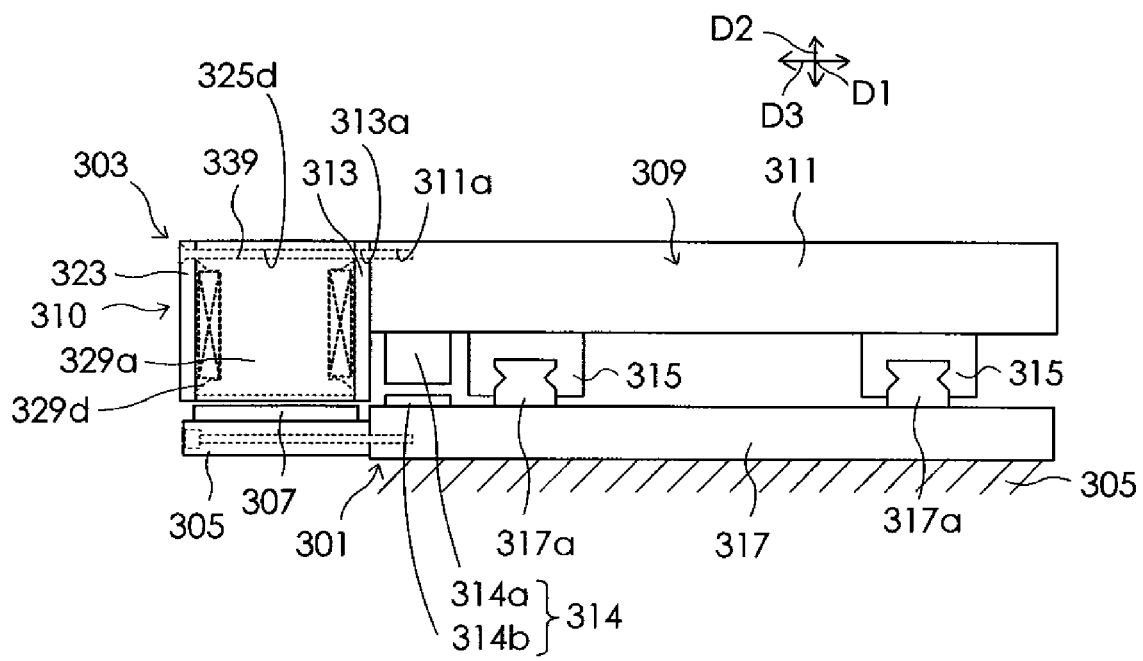
FIG. 14 is a front view of a linear motor according to a fourth embodiment of the present invention.
Figure 15:
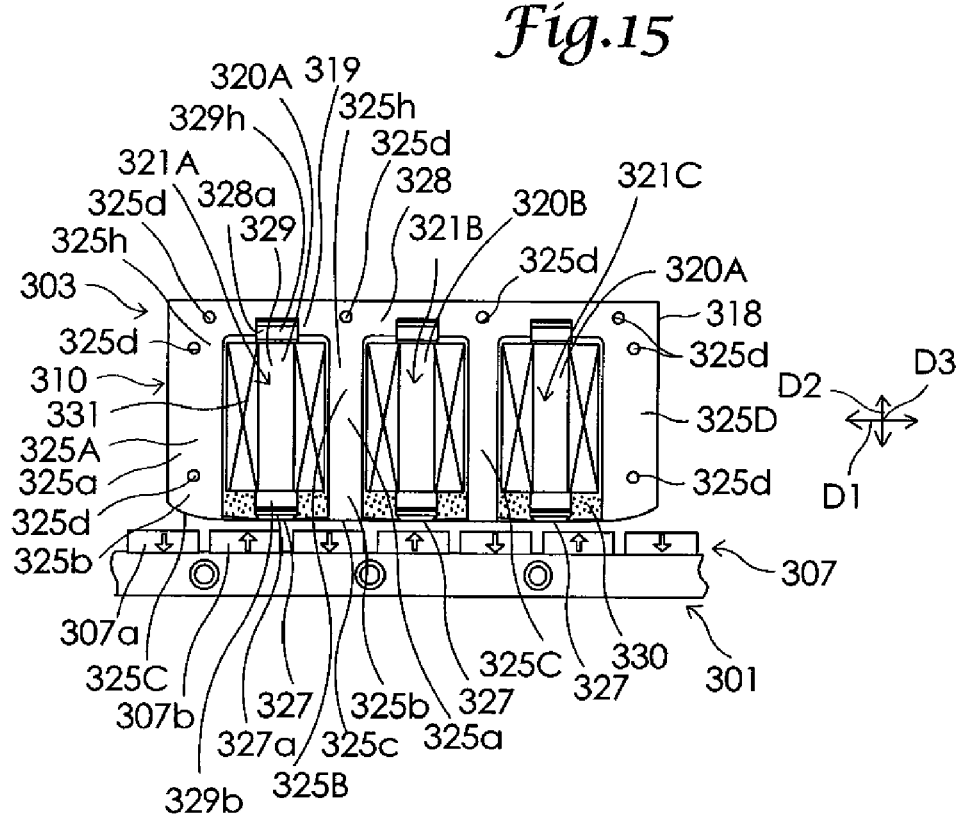
FIG. 15 is a side view of the linear motor according to the fourth embodiment of the present invention, wherein a movable stage is omitted from the illustration.

FIG. 14 is a front view of a linear motor and FIG. 15 is a side view of a linear motor according to the fourth embodiment of the present invention, wherein a movable stage 309 is omitted from the illustration. As shown in FIG. 14 and FIG. 15, the linear motor according to this embodiment comprises the stator 301 and a movable element 303. FIG. 15 shows the linear motor, wherein a covering member 323 is omitted from the illustration. The stator 301 comprises a magnetic pole row 307 located on a base 305. The magnetic pole row 307 is constituted from a plurality of permanent magnets 307*a* of N pole and a plurality of permanent magnets 307*b* of S pole that are alternately arranged therein.

As shown in FIG. 14, the movable element 303 is provided with an armature 310 fixed onto a movable stage 309 which can be moved along the stator 301, and is located so that the armature 310 opposes to a magnetic pole row 307.

The movable stage 309 includes a stage body 311 formed in a plate shape, a mounting plate 313 and two sliders 315. The stage body 311 is formed in a rectangle-plate shape, and formed with eight through holes 311a opening toward a side surface thereof. The mounting plate 313 is mounted on a stage body 311 so that a direction of a thickness thereof is orthogonal to the stage body 311. The mounting plate 313 is formed with eight screw holes 313a. An armature 310 is secured to the stage body 311 and the mounting plate 313 with screws 339 as described later. The movable stage 309 is slidably supported by two rails 317a respectively disposed on a base plate 317 which is secured to a base 305. In this embodiment, the stage body 311 is provided with the two sliders 315, which are slidably disposed on the two rails 317a. With this arrangement, the armature 310 reciprocates in an extending direction of the magnetic pole row 307. Accordingly the extending direction of the magnetic pole 307 is defined as a moving direction D1 of the movable element 303. In the linear motor of this embodiment, the movable stage 309 is disposed adjacent to the armature 310 in an orthogonal direction D3 orthogonal to the moving direction D1 and an opposing direction D2 in which the stator 301 and the movable element 303 oppose to each other. The stage body 311 is provided with a sensor head 314a of a linear sensor 314, and the base plate 317 is provided with a sensor scale 314b so that the sensor scale 314b opposes to the sensor head 314a.

The armature 310 includes an armature core main portion 319 and three first magnetic pole constituent component 321A to 321C and a covering member 323. The armature core main portion 319 has a yoke 328 extended in the moving direction D1, four second magnetic pole portions 325A to 325D and three magnetic pole connecting sections 327. The armature core main portion 319 is constituted by stacking a plurality of magnetic steel sheets formed in a predetermined shape in the orthogonal direction D3 which is orthogonal to the moving direction D1 and the opposing direction D2 in which the stator 301 and the movable element 303 are opposed to each other. Each of the second magnetic pole portions 325A to 325D is extended from the yoke 328 toward the magnetic pole row 307 to constitute a magnetic pole portion which is not wound with a winding conductor. Four second magnetic pole portions 325A to 325D are spaced in the moving direction D1. Out Of the four second magnetic pole portions 325A to 325D, the second magnetic pole portions 325A, the second magnetic pole portions 325D which are respectively located at each end thereof are formed so that a distance between each magnetic pole surface of the second magnetic pole portions 325A, 325D and an upper surfaces of in permanent magnet 307a, 307b the magnetic pole row 307 is being increased outwardly in the moving direction D1. In other words, a distance between magnetic pole surfaces of the second magnetic pole portions 325A, 325D, opposing to each other in the opposing direction D2 is being reduced outwardly in the moving direction D1. In FIG. 15, more reference numerals are given to the second magnetic pole portions 325A, 325B for more detailed explanation. The second magnetic pole portions 325A to 325D include a magnetic pole center portion 325a, a magnetic pole end portion 325b, and a magnetic pole surface constituent portion 325c. The magnetic pole center portion 325a faces a winding portion 331 of the adjacent first magnetic pole portion 320A to 320C as described later. The magnetic pole end portion 325b is integrally formed with the magnetic pole center portion 325a. The magnetic pole surface constituent portions 325c are integrally formed with the magnetic pole end portions 325b, located on a side of the magnetic pole row, and oppose to the magnetic pole row 307. Through holes 325d through which screws 339 pass are formed in the vicinity of end portions of the second magnetic pole portion 325A, 325D and in the yoke 328 in the orthogonal direction D3.

Figure 16:
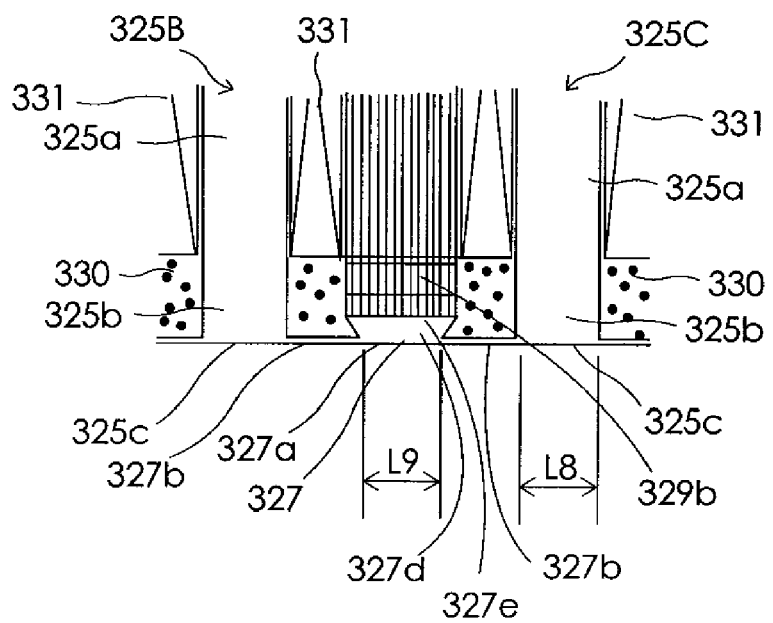
FIG. 16 is a partially enlarged view of FIG. 15.

The three magnetic pole connecting sections 327 respectively connect the magnetic pole end portions, of two adjacent second magnetic pole portions of the three second magnetic pole portions 325A to 325D, located on a side of the magnetic pole row. As shown in FIG. 16, the magnetic pole connecting portion 327 include the magnetic pole surface constituent portion 327a of the first magnetic pole portions 320A to 320C and two connecting portions 327b. A surface of the magnetic pole surface constituent portion 327a located on the side of the first magnetic pole constituent component 321 is more raised toward the first magnetic pole constituent component 321 than inner surfaces, of the two connecting portions 327b. The magnetic pole surface constituent portion 327a includes a flat portion 327d and a raised portion 327e which is raised from the flat portion 327d toward the non-wound portion 329b of the first magnetic pole portion (320A to 320C). The raised portion 327C abuts onto the non-wound portion 329b. The raised portion 327e is formed so that a width of the raised portion 327e as measured along the moving direction D1 gradually becomes larger toward the non-wound portion 329b. A width L8 of a portion of the magnetic pole end portion 325b of the second magnetic pole portion, as measured along the moving direction D1, is equal to a width L9 of the flat portion 327d (a width of a base portion of the raised portion 327e), as measured along the moving direction D1. The two connecting portion 327b respectively connect the magnetic pole surface constituent portion 327a of the first magnetic pole portion (320A to 320C) and the magnetic pole surface constituent portion 325c of the second magnetic pole portion (325A to 325D) that are located adjacent to each other.

More reference numerals are given to a magnetic pole constituent component 321A of FIG. 15 for more detailed explanation. Each of three first magnetic pole constituent components 321A to 321C includes a magnetic pole main portion 329 and a winding portion 331. The magnetic pole main portion 329 is constituted by stacking a plurality of magnetic steel sheets formed in a predetermined shape, in the moving direction D1 (a direction orthogonal to the orthogonal direction D3 in which the magnetic steel sheets are stacked for the armature core main portion 319). The magnetic pole main portion 329 includes a wound portion 329a which is wound with a winding conductor, and the pair of non-wound portions 329b, 329h which are integrally formed with the wound portion 329a at both ends of the wound portion 329a. The non-wound portion 329h, located on the side of the yoke is engaged with a recessed portion 328a of the yoke 328. End surfaces of the wound portions 329a of the first magnetic pole portion (320A to 320C) in the orthogonal direction D3 are located more inwardly than end surfaces of the second magnetic pole portions 325A to 325D in the orthogonal direction D3. End surfaces of the pair of non-wound portion (329b, 329h) of the first magnetic pole portion (320A to 320C) are located outwardly more than end surfaces of the wound portion 329a of the first magnetic pole portion (320A to 320C) in the orthogonal direction D3. Therefore a magnetic pole main portion 329 of each of the first magnetic pole portions 320A to 320C is formed in an H shape as viewed in the moving direction D1. The end surfaces 329d of the pair of the non-wound portion 329b, 329h are inclined so that a distance between the end surfaces in the orthogonal direction D3 is increasing outwardly in the opposing direction D2 from the wound portion 329a as shown in FIG. 14. As shown in FIG. 15, the non-wound portion 329h, located on the side of yoke, engages with the recessed portion 328a of the yoke 328, and the non-wound portion 329b, located on the side of the magnetic pole row, abuts onto the magnetic pole surface constituent portion 327a. Synthetic resin 330 is filled into a space between the armature core main portion 319 and each of the three first magnetic pole constituent components 321A to 321C to form a mold portion. Since the mold portion works to prevent the magnetic pole surface constituent portion and the non-wound portion of the first magnetic pole constituent component from moving, three first magnetic pole constituent components 321A to 321C are secured into the armature core main portion 319. Thus, the first magnetic pole portion (320A to 320C) is constituted from the magnetic pole main portions 329 and the pairs of magnetic pole surface constituent portions 327a. Three first magnetic pole portions 320A to 320C which are respectively provided with the wound portions wound with the winding conductor and four second magnetic pole portions 325A to 325D which are not wound with the winding conductor are alternately arranged at a predetermined interval in the moving direction D1 so that the second magnetic pole portions 325A, 325D are located on each end of the armature core in the moving direction D1 of the movable element 303.

The winding portion 331 is provided at the wound portion 329a of the magnetic pole main portion 329. In this embodiment as well as the first embodiment, AC currents of a U phase, a V phase and a W phase respectively flow through the winding portions 331 of the first magnetic pole constituent components 321A to 321C.

A covering member 323 is in a plate-like shape, and formed with eight through holes 337a which aligned with the eight through holes 325d in the armature 310 as shown in FIG. 14. The armature 310 is secured to the stage body 311 and the mounting plate 313 with screws 339 which pass all the way through the through holes 337a and the through hole 325d of each of the second magnetic pole portions 325A, 325D and the yoke 328, and then threadably fit into the screw holes 311a. In the linear motor according to this embodiment, a linear motor can be constituted from one magnetic pole row. The raised portion 327e of the magnetic pole surface constituent portion 327a is formed so that a dimension thereof, as measured along the moving direction D1, is being increased from the flat portion 327d toward the non-wound portion 329b. Thus an area where the magnetic pole surface constituent portion 327a of the fist magnetic pole portion contacts the non-wound portion 329b can be increased. Since some space is left between the first magnetic pole portion and the armature core main portion when both portions are combined, a synthetic resin is filled thereinto. The synthetic resin covers around both of the raised portion and the non-wound portion to form a mold portion. The mold portion works to prevent the magnetic pole surface constituent portion and the non-wound portion of the first magnetic pole portion from moving. Accordingly, bonding of the magnetic pole surface constituent portion 327a of the first magnetic pole portion and the non-wound portion 329b can be strengthened. Since the width L8 of the end portion of the magnetic pole end portion 329b, as measured along the moving direction D1, is equal to the width L9 of the flat portion 327d, as measured along the moving direction, the magnetic resistances on the magnetic pole surfaces, where the thrust forces are generated, of the first magnetic pole portions and that of the second magnetic pole portions vary in a regular periodic cycle. Therefore the cogging torque can be reduced.

In the first to third embodiments described above, the present invention is introduced by using examples appropriate to a linear motor comprising two magnetic pole rows and an armature arranged between the two magnetic pole rows. However, of course it is possible to apply a structure of the first and second magnetic pole portions of the linear motor in the first to third embodiments to a linear motor which includes a magnetic pole row and an armature opposing the magnetic pole row.

In the fourth embodiment as described above, the present invention is introduced by using examples appropriate to a linear motor comprising one magnetic pole row and an armature which opposes to the magnetic pole row. However, of course it is possible to apply a structure of the first and second magnetic pole portions of the linear motor in the fourth embodiment to a linear motor which includes two magnetic pole row and an armature arranged between tow magnetic pole rows.

While the preferred embodiments of the invention have been described with a certain degree of particularity with reference to the drawings, obvious modifications and variations are possible in light of the above teachings. It is therefore to be understood that within the scope of the appended claims, the invention may be practiced otherwise than specifically described.

What is claimed is:

1. A linear motor which includes a stator and a movable element comprising:

a magnetic pole row constituted from a plurality of permanent magnets arranged in a row; and an armature including an armature core having a plurality of first magnetic pole portions and a plurality of second magnetic portions, and a plurality of winding portions which are respectively wound with the winding conductor and provided on the plurality of first magnetic pole portions, the plurality of first magnetic pole portions each including a wound portion which is wound with the winding conductor, a non-wound portion which is not wound with the winding conductor and is integrally provided at each end of the wound portion, and a magnetic pole surface constituent portion which is connected to the non-wound portion and is opposed to the magnetic pole row;

the plurality of second magnetic pole portions which are not wound with the winding conductor, each including a magnetic pole center portion which faces the wound portions of one or more of the first magnetic pole portions located adjacent to the second magnetic pole portion, a magnetic pole end portion which is integrally formed with the magnetic pole center portion at each end of the magnetic pole center portion and faces the non-wound portions of the one or more first magnetic pole portions located adjacent to the second magnetic pole portion, and a magnetic pole surface constituent portion which is integrally formed with the magnetic pole end portion and is opposed to the magnetic pole row;

the first magnetic pole portions and the second magnetic pole portions being extended in an opposing direction in which the stator and the movable element are opposed to each other, and the first magnetic pole portions and the second magnetic pole portions being alternately arranged at a predetermined interval in a moving direction of the movable element so that the second magnetic pole portion is located at each end of the armature core in the moving direction of the movable element;

the magnetic pole surface constituent portion of the first magnetic pole portion, and the magnetic pole surface constituent portion of the second magnetic pole portion that are located adjacent to each other being connected with a connecting portion; and the magnetic pole surface constituent portions of the plurality of first magnetic pole portions, the plurality of second magnetic pole portions, and the connecting portions being integrally formed with one another;

wherein dimensions of the magnetic pole surface constituent portions of the first magnetic pole portions in an orthogonal direction orthogonal to the moving direction and the opposing direction are equal to dimensions of the second magnetic pole portions in the orthogonal direction;

wherein end surfaces of the wound portion of the first magnetic pole portion are located more inwardly in the orthogonal direction than end surfaces of the second magnetic pole portion;

wherein an armature core main portion except the wound portions and the non-wound portions of the plurality of first magnetic pole portions is constituted by stacking in the orthogonal direction a plurality of magnetic steel sheets formed in a predetermined shape; and wherein the stator is provided with one of the magnetic pole row and the armature, and the movable element is provided with the other of the magnetic pole row and armature.

2. A linear motor which includes a stator and a movable element comprising:

two magnetic pole rows each constituted from a plurality of permanent magnets arranged in a row; and an armature including an armature core having a plurality of first magnetic pole portions and a plurality of second magnetic pole portions, and a plurality of winding portions which are respectively wound with a winding conductor and provided on the plurality of first magnetic pole portions, the plurality of first magnetic pole portions each including a wound portion which is wound with the winding conductor, a pair of non-wound portions which are not wound with the winding conductor and are integrally provided at each end of the wound portion, and a pair of magnetic pole surface constituent portions which are respectively connected to the non-wound portions and are respectively opposed to the pair of magnetic pole rows;

the plurality of second magnetic pole portions which are not wound with the winding conductor, each including a magnetic pole center portion which faces the wound portions of one or more of the first magnetic pole portions located adjacent to the second magnetic pole portion, a pair of magnetic pole end portions which are integrally formed with the magnetic pole center portion at ends of the magnetic pole center portion and face respectively the non-wound portions of the one or more first magnetic pole portions located adjacent to the second magnetic pole portion, and a pair of magnetic pole surface constituent portions which are integrally formed with the magnetic pole end portions and are respectively opposed to the pair of the magnetic pole rows;

the first magnetic pole portions and the second magnetic pole portions being extended in an opposing direction in which the stator and the movable element are opposed to each other, and the first magnetic pole portions and the second magnetic pole portions being alternately arranged at a predetermined interval in the moving direction of the movable element so that the second magnetic pole portion is located at each end of the armature core in the moving direction of the movable element;

the magnetic pole surface constituent portion of the first magnetic pole portion and the magnetic pole surface constituent portion of the second magnetic pole portion that are opposed to one of the magnetic pole rows and located adjacent to each other being connected with a connecting portion;

the magnetic pole surface constituent portion of the first magnetic pole portion and the magnetic pole surface constituent portion of the second magnetic pole portion that are opposed to other one of the magnetic pole rows and located adjacent to each other being connected with a connecting portion; and the magnetic pole surface constituent portions of the plurality of first magnetic pole portions, the plurality of second magnetic pole portions, and the connecting portions, all of which are opposed to the one of the magnetic pole rows, being integrally formed with one another, and the magnetic pole surface constituent portions of the plurality of first magnetic pole portions, the plurality of second magnetic pole portions, and the connecting portions, all of which are opposed to the other one of the magnetic pole rows, being integrally formed with one another;

wherein dimensions of the magnetic pole surface constituent portions of the first magnetic pole portions in an orthogonal direction orthogonal to the moving direction and the opposing direction are equal to dimensions of the second magnetic pole portions in the orthogonal direction;

wherein end surfaces of the wound portion of the first magnetic pole portion are located more inwardly in the orthogonal direction than end surfaces of the second magnetic pole portion;

wherein an armature core main portion except the wound portions and the non-wound portions of the plurality of first magnetic pole portions is constituted by stacking in the orthogonal direction a plurality of magnetic steel sheets formed in a predetermined shape; and wherein the stator is provided with one of the magnetic pole row and the armature, and the movable element is provided with the other of the magnetic pole row and armature.

3. The linear motor of claim 2, wherein the stator is provided with the two magnetic pole rows, and the movable element is provided with the armature;

a movable stage which can be moved along the stator is mounted onto an end portion of the armature core main portion in the orthogonal direction; and through holes through which screws for securing the movable stage to the armature core main portion pass in the orthogonal direction are formed in each of the plurality of second magnetic pole portions.

4. The linear motor of claim 3, wherein the non-wound portion of the first magnetic pole portion and the magnetic pole surface constituent portion of the first magnetic pole portion which is connected thereto are respectively shaped so that the non-wound portion may engage with the magnetic pole surface constituent portion by causing relative movement in the orthogonal direction between the non-wound portion and the magnetic pole surface constituent portion; and a magnetic pole main portion including the wound portion and the pair of non-wound portions of the first magnetic pole portion is constituted by stacking in the orthogonal direction a plurality of magnetic steel sheets formed in a predetermined shape.

5. The linear motor of claim 3, wherein
end surfaces of the non-wound portion of the first magnetic pole portion in the orthogonal direction are located more outwardly than end surfaces of the wound portion of the first magnetic pole portion in the orthogonal direction; and
a magnetic pole main portion including the wound portion and the pair of non-wound portions of the first magnetic pole portion is constituted by stacking in the moving direction a plurality of magnetic steel sheets formed in a predetermined shape.

6. The linear motor of claim 5, wherein
the end surfaces of the non-wound portion are inclined so that a distance between the end surfaces in the orthogonal direction is reduced toward the wound portion from the magnetic pole surface constituent portion.

7. The linear motor of claim 3, wherein
the through holes are respectively formed in the magnetic pole end portions;
a cross section of the magnetic pole end portion of the second magnetic pole portion, as taken so that a perpendicular line to the cross section may extend in the orthogonal direction, is shaped in such a manner that the cross section is widened toward both sides of the moving direction with respect to the magnetic pole center portion; and
a magnetic pole main portion including the wound portion and the pair of non-wound portions of the first magnetic pole portion is constituted by stacking a plurality of magnetic steel sheets formed in a predetermined shape.

8. The linear motor of claim 7, wherein
a cross-sectional area of the wound portion of the first magnetic pole portion, as taken so that a perpendicular line to the cross section thereof may extend in the opposing direction, is equal to a cross-sectional area of the magnetic pole center portion of the second magnetic pole portion, as taken so that a perpendicular line to the cross section thereof may extend in the opposing direction.

9. The linear motor of claim 7, wherein
a width of the non-wound portion of the first magnetic pole portion as measured along the moving direction is equal to a width of a portion, which is opposed to the magnetic pole row, of the magnetic pole end portion of the second magnetic pole portion as measured along the moving direction.

10. The linear motor of claim 3, wherein
the magnetic pole surface constituent portion of the first magnetic pole portion includes a raised portion which is raised toward the non-wound portion of the first magnetic pole portion and abuts onto the non-wound portion;
the raised portion is formed in such a manner that a width of the raised portion as measured along the moving direction gradually becomes larger toward the non-wound portion;
a width of the magnetic pole end portion opposed to the magnetic pole row, as measured along the moving direction, is equal to a width of a base portion of the raised portion, as measured along the moving direction; and
a magnetic pole main portion including the wound portion and the pair of non-wound portions of the first magnetic pole portion is constituted by stacking in the orthogonal direction the plurality of magnetic steel sheets formed in a predetermined shape.

11. The linear motor of claim 3, wherein
the armature core is constituted from a plurality of divided armature core units which are arranged in the moving direction; and
two adjacent units of the divided armature core units are connected to each other with an engaging structure.

12. A linear motor which includes a stator and a movable element comprising:
a magnetic pole row constituted from a plurality of permanent magnets arranged in a row; and
an armature including an armature core having a yoke, a plurality of first magnetic pole portions and a plurality of second magnetic portions, and a plurality of winding portions which are respectively wound with a winding conductor and provided on the plurality of first magnetic pole portions,
the yoke being extended in a moving direction of the movable element;
the plurality of first magnetic pole portions each including a wound portion which is wound with the winding conductor, a pair of non-wound portions which are not wound with the winding conductor and are integrally provided at ends of the wound portion, and a magnetic pole surface constituent portion connected to one of the non-wound portions that is located on a side of and opposed to the magnetic pole row;
the plurality of second magnetic pole portions which are not wound with the winding conductor, each including a magnetic pole center portion which faces the wound portions of one or more of the first magnetic pole portions located adjacent to the second magnetic pole portion, a magnetic pole end portion which is integrally formed with the magnetic pole center portion at each end of the magnetic pole center portion and faces the non-wound portions of the one or more first magnetic pole portions located adjacent to the second magnetic pole portion, and a magnetic pole surface constituent portion which is integrally formed with the magnetic pole end portion located on the side of and opposed to the magnetic pole row;
the first magnetic pole portions and the second magnetic pole portions being extended toward the magnetic pole row from the yoke, and the first magnetic pole portions and the second magnetic pole portions being alternately arranged at a predetermined interval in a moving direction of the movable element so that the second magnetic pole portion is located at each end of the armature core in the moving direction of the movable element;
the magnetic pole surface constituent portion of the first magnetic pole portion, and the magnetic pole surface constituent portion of the second magnetic pole portion that are opposed to the magnetic pole row and located adjacent to each other being connected with a connecting portion; and
the magnetic pole surface constituent portion of the first magnetic pole portion, the second magnetic pole portion, and the connecting portion, all of which are opposed to the magnetic pole row, being integrally formed with one another;
wherein dimensions of the magnetic pole surface constituent portions of the first magnetic pole portions in an orthogonal direction orthogonal to the moving direction and an opposing direction in which the stator and the movable element are opposed to each other are equal to dimensions of the second magnetic pole portions in the orthogonal direction;

wherein end surfaces of the wound portion of the first magnetic pole portion are located more inwardly in the orthogonal direction than end surfaces of the second magnetic pole portion;

wherein an armature core main portion except the wound portions and the non-wound portions of the plurality of first magnetic pole portions is constituted by stacking in the orthogonal direction a plurality of magnetic steel sheets formed in a predetermined shape; and wherein the stator is provided with one of the magnetic pole row and the armature, and the movable element is provided with the other of the magnetic pole row and armature.

13. The linear motor of claim 12, wherein
the stator is provided with the magnetic pole row, and the movable element is provided with the armature;
a movable stage which can be moved along the stator is mounted onto an end portion of the armature core main portion in the orthogonal direction; and
through holes through which screws for securing the movable stage of the armature core to the armature core main portion pass in the orthogonal direction are formed in the armature core main portion.

14. The linear motor of claim 13, wherein
the non-wound portion, located on the side of the yoke, of the first magnetic pole portion, and the yoke are shaped so that the non-wound portion located on the side of the yoke may engage with the yoke by causing relative movement in the orthogonal direction between the non-wound portion located on the side of the yoke and the yoke;
the non-wound portion, located on the side of the magnetic pole row, of the first magnetic pole portion and the magnetic pole surface constituent portion are shaped so that the non-wound portion located on the side of the magnetic pole row may engage with the magnetic pole surface constituent portion by causing relative movement in the orthogonal direction between the non-wound portion located on the side of the magnetic pole row and the magnetic pole surface constituent portion; and
a magnetic pole main portion including the wound portion and the pair of non-wound portions of the first magnetic pole portion is constituted by stacking in the orthogonal direction a plurality of magnetic steel sheets formed in a predetermined shape.

15. The linear motor of claim 13, wherein
end surfaces of the non-wound portion, located on the side of the magnetic pole row, of the first magnetic pole portion in the orthogonal direction are located more outwardly than end surfaces of the wound portion of the first magnetic pole portion in the orthogonal direction; and
a magnetic pole main portion including the wound portion and the pair of non-wound portions of the first magnetic pole portion is constituted by stacking in the moving direction a plurality of magnetic steel sheets formed in a predetermined shape.

16. The linear motor of claim 15, wherein
the end surfaces of the non-wound portion located on the side of the magnetic pole row are inclined so that a distance between the end surfaces in the orthogonal direction is reduced toward the wound portion from the magnetic pole surface constituent portion.

17. The linear motor of claim 13, wherein
the through holes are respectively formed in the magnetic pole end portions located on the side of the magnetic pole row;
a cross section of the magnetic pole end portion located on the side of the magnetic pole row, as taken so that a perpendicular line to the cross section may extend in the orthogonal direction, is shaped in such a manner that the cross section is widened toward both sides of the moving direction with respect to the magnetic pole center portion; and
a magnetic pole main portion including the wound portion and the pair of non-wound portions of the first magnetic pole portion is constituted by stacking a plurality of magnetic steel sheets formed in a predetermined shape.

18. The linear motor of claim 17, wherein
a cross-sectional area of the wound portion of the first magnetic pole portion, as taken so that a perpendicular line to the cross section thereof may extend in the opposing direction, is equal to a cross-sectional area of the magnetic pole center portion of the second magnetic pole portion, as taken so that a perpendicular line to the cross section thereof may extend in the opposing direction.

19. The linear motor of claim 17, wherein
a width of the non-wound portion, located on the side of the magnetic pole row, of the first magnetic pole portion as measured along the moving direction is equal to a width of a portion, which is opposed to the magnetic pole row, of the magnetic pole end portion, located on the side of the magnetic pole row, of the second magnetic pole portion as measured along the moving direction.

20. The linear motor of claim 13, wherein
the magnetic pole surface constituent portion of the first magnetic pole portion includes a raised portion which is raised toward the non-wound portion, located on the side of the magnetic pole row, of the first magnetic pole portion and abuts onto the non-wound portion located on the side of the magnetic pole row;
the raised portion is formed in such a manner that a width of the raised portion as measured along the moving direction gradually becomes larger toward the non-wound portion located on the side of the magnetic pole row;
a width of the magnetic pole end portion located on the side of and opposed to the magnetic pole row, as measured along the moving direction, is equal to a width of a base portion of the raised portion, as measured along the moving direction; and
a magnetic pole main portion including the wound portion and the pair of non-wound portions of the first magnetic pole portion is constituted by stacking in the orthogonal direction the plurality of magnetic steel sheets formed in a predetermined shape.

21. The linear motor of claim 13, wherein
the armature core is constituted from a plurality of divided armature core units which are arranged in the moving direction; and
two adjacent units of the divided armature core units are connected to each other with an engaging structure.

* * * * *